(12) United States Patent
Chen et al.

(10) Patent No.: US 11,272,485 B2
(45) Date of Patent: Mar. 8, 2022

(54) INFORMATION TRANSMISSION METHOD, TERMINAL AND BASE STATION

(71) Applicant: VIVO MOBILE COMMUNICATION CO.,LTD., Guangdong (CN)

(72) Inventors: Xiaohang Chen, Chang'an Dongguan (CN); Xueming Pan, Chang'an Dongguan (CN)

(73) Assignee: VIVO MOBILE COMMUNICATION CO., LTD., Chang'An Dongguan (CN)

( * ) Notice: Subject to any disclaimer, the term of this patent is extended or adjusted under 35 U.S.C. 154(b) by 101 days.

(21) Appl. No.: 16/638,118

(22) PCT Filed: Aug. 9, 2018

(86) PCT No.: PCT/CN2018/099577
§ 371 (c)(1),
(2) Date: Feb. 10, 2020

(87) PCT Pub. No.: WO2019/029611
PCT Pub. Date: Feb. 14, 2019

(65) Prior Publication Data
US 2020/0245319 A1 Jul. 30, 2020

(30) Foreign Application Priority Data
Aug. 11, 2017 (CN) .......................... 201710687278.4

(51) Int. Cl.
*H04W 72/04* (2009.01)
*H04L 5/00* (2006.01)

(52) U.S. Cl.
CPC ....... *H04W 72/0413* (2013.01); *H04L 5/0007* (2013.01); *H04L 5/0053* (2013.01); *H04L 5/0094* (2013.01); *H04W 72/042* (2013.01)

(58) Field of Classification Search
CPC ........... H04W 72/0413; H04W 72/042; H04W 72/0406; H04L 5/0007; H04L 5/0094; H04L 5/0053
See application file for complete search history.

(56) References Cited

U.S. PATENT DOCUMENTS

2011/0268080 A1 11/2011 Luo et al.
2013/0286990 A1* 10/2013 Park ...................... H04L 1/1896
370/329

(Continued)

FOREIGN PATENT DOCUMENTS

CN 104683080 A 6/2015
CN 106507486 A 3/2017

(Continued)

OTHER PUBLICATIONS

Ericsson. "R1-1711505 on HARQ Retransmission for SPS/Grant-Free" 3GPP TSG RAN WGI NR Ad-Hoc #2, Jun. 30, 2017.

(Continued)

*Primary Examiner* — Maharishi V Khirodhar
*Assistant Examiner* — Kenneth P Hunt
(74) *Attorney, Agent, or Firm* — Maschoff Brennan

(57) ABSTRACT

The present disclosure provides an information transmission method, a terminal and a base station. The information transmission method is applied to a terminal and includes: carrying uplink control information on at least one control region of a grant-free resource; and transmitting the uplink control information carried on the grant-free resource to a base station.

18 Claims, 15 Drawing Sheets

(56) References Cited

U.S. PATENT DOCUMENTS

| | | | |
|---|---|---|---|
| 2017/0026956 A1 | 1/2017 | Yin et al. | |
| 2017/0367110 A1* | 12/2017 | Li | H04W 74/0816 |
| 2018/0288746 A1* | 10/2018 | Zhang | H04L 1/0031 |
| 2019/0045552 A1* | 2/2019 | Blankenship | H04L 1/08 |
| 2019/0199477 A1* | 6/2019 | Park | H04L 1/0067 |
| 2020/0037314 A1* | 1/2020 | Xiong | H04L 5/0091 |
| 2020/0045722 A1* | 2/2020 | Bae | H04L 5/0044 |

FOREIGN PATENT DOCUMENTS

| | | |
|---|---|---|
| CN | 106550439 A | 3/2017 |
| CN | 106788912 A | 5/2017 |
| CN | 106793091 A | 5/2017 |
| EP | 2 464 030 A2 | 6/2012 |
| EP | 2 587 699 A2 | 5/2013 |

OTHER PUBLICATIONS

Chinese Search Report issued in corresponding application No. 201710687278.4, dated Apr. 24, 2019.

Chinese Office Action issued in corresponding application No. 201710687278.4, dated Mar. 25, 2020.

European Search Report issued in corresponding application No. 18844981.3, dated Jul. 15, 2020.

International Search Report and Written Opinion issued in corresponding application No. PCT/CN2018/099577, dated Feb. 27, 2020.

Panasonic, "Discussion on uplink control channel for NR", 3GPP, R1-1611894, Reno, USA, Nov. 14-18, 2016.

Huawei, HiSilicon, "On transmission of UCI on PUSCH", 3GPP, R1-1706958, Hangzhou, China, May 15-19, 2017.

Huawei, HiSilicon, "UCI piggyback on PUSCH", 3GPP, R1-1709963, Qingdao, China, Jun. 27-30, 2017.

Ericsson, "On HARQ Retransmission for SPS/Grant-Free", 3GPP, R1-1711505, Qingdao, China, Jun. 27-30, 2017.

* cited by examiner

INFORMATION TRANSMISSION METHOD, TERMINAL AND BASE STATION

CROSS-REFERENCE TO RELATED APPLICATION

This application is the U.S. national phase of PCT Application No. PCT/CN2018/099577 filed on Aug. 9, 2018, which claims priority to Chinese Patent Application No. 201710687278.4 filed on Aug. 11, 2017, the disclosures of which are incorporated in their entirety by reference herein.

TECHNICAL FIELD

The present disclosure relates to the field of communication technology, and in particular to an information transmission method, a terminal and a base station.

BACKGROUND

The $5^{th}$ Generation (5G) mobile communication system needs to adapt to more diverse scenarios and service requirements. The major scenarios of the New Radio (NR) include mobile broadband enhancement (eMBB), massive Machine Type Communication (mMTC), and Ultra-Reliable and Low-Latency Communication (URLLC). These scenarios require the system to have high reliability, low latency, wide bandwidth, wide coverage, and so on. For services of certain scenarios, transmission of low latency and highly reliability are required. For such service requirements, the NR supports grant-free transmission to reduce signaling interaction processes, and guaranteeing low latency requirement. A grant-free resource can be semi-statically configured through a Radio Resource Control (RRC) signaling. When a service with a high priority (such as URLLC service data) arrives, the user equipment (UE, also called a terminal) can perform data transmission on the grant-free resource.

The NR defines two transmission modes for the grant-free transmission:

Mode 1: the grant-free resource is configured/reconfigured only based on the RRC without any L1 signaling for activating and deactivating.

Mode 2: the grant-free resource is configured/reconfigured based on both the RRC and the L1 signaling (which is used for activating and deactivating).

When performing transmission on the grant-free resource, some control information may be carried to assist the base station to take effective measures for performing data decoding or retransmission processing. However, in the related art, there is no solution about how to multiplex the UCI to perform transmission on the grant-free resource, and the integrity of the communication process and the reliability of network communication cannot be ensured.

SUMMARY

The present disclosure provides an information transmission method, a terminal and a base station.

In a first aspect, some embodiments of the present disclosure provides an information transmission method applied to a terminal including: carrying uplink control information on at least one control region of a grant-free resource; and transmitting the uplink control information carried on the grant-free resource to a base station.

In a second aspect, some embodiments of the present disclosure further provides an information transmission method applied to a terminal including: receiving uplink control information carried on a grant-free resource transmitted by a terminal; wherein the uplink control information is carried on at least one control region of the grant-free resource.

In a third aspect, some embodiments of the present disclosure further provides a terminal including: a carrying module for carrying uplink control information on at least one control region of a grant-free resource; and a transmission module for transmitting the uplink control information carried on the grant-free resource to a base station.

In a fourth aspect, some embodiments of the present disclosure further provides a terminal including: a storage, a processor and a computer program stored in the storage and running in the processor, the computer program, when executed by the processor, is capable of causing the processor to perform the steps of the above information transmission method applied to a terminal.

In a fifth aspect, some embodiments of the present disclosure further provides a computer readable storage medium, wherein the computer readable storage medium stores thereon a computer program which, when executed by a processor, is capable of causing the processor to perform the steps of the above information transmission method applied to a terminal.

In a sixth aspect, some embodiments of the present disclosure further provides a base station including: a receiving module for receiving uplink control information carried on a grant-free resource transmitted by a terminal; wherein the uplink control information is carried on at least one control region of the grant-free resource.

In a seventh aspect, some embodiments of the present disclosure further provides a base station including: a storage, a processor and a computer program stored in the storage and running in the processor, the computer program, when executed by the processor, is capable of causing the processor to perform the steps of the above information transmission method applied to a terminal.

In an eighth aspect, some embodiments of the present disclosure further provides a computer readable storage medium, wherein the computer readable storage medium stores thereon a computer program which, when executed by a processor, is capable of causing the processor to perform the steps of the above information transmission method applied to a terminal.

DETAILED DESCRIPTION

The present disclosure will be described in detail below with reference to the drawings and specific embodiments in order to make the objects, technical solutions and advantages of the present disclosure more clear.

In view of the above problem that there is no solution for multiplexing UCI to perform transmission on the grant-free resource in the related art, and the integrity of the communication process and the reliability of network communication cannot be ensured, the present disclosure provides an information transmission method, a terminal and a base station.

Figure 1:
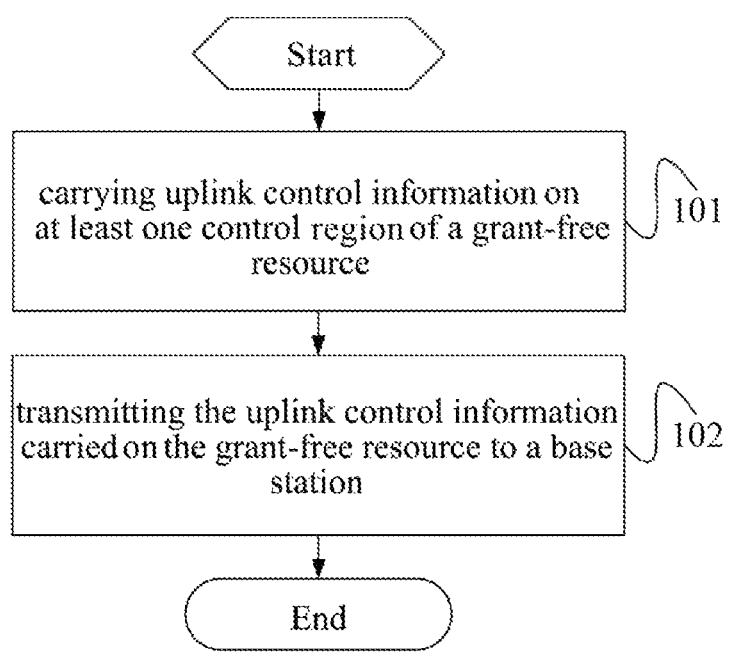
FIG. 1 illustrates a first schematic flow chart showing an information transmission method according to some embodiments of the present disclosure.

As shown in FIG. 1, some embodiments of the present disclosure provide an information transmission method which is applied to a terminal and includes steps 101 to 102.

Step 101, carrying uplink control information on at least one control region of a grant-free resource.

It should be noted that the uplink control information is UCI.

The types of UCI which can be transmitted on the grant-free resource includes one or more of the following:

1.1 Hybrid automatic repeat request (HARQ) process ID, which is an ID for indicating a grant-free transmission of an HARQ process currently used;

1.2 New data indication, which is used to indicate a repetition of initial transmission;

1.3 Other UCI:

1.3.1 HARQ acknowledgment/negative acknowledgment (ACK/NACK);

for example, an acknowledgment for layer 1 activating/deactivating signaling; or an acknowledgment for downlink data transmission;

1.3.2 Channel quality indication (CQI);

If the modulation and coding scheme (MCS) set supported by the URLLC service is different from the eMBB service, for example, the URLLC service supports only the low-order modulation and the low bit rate MCS, the CQI reported by the UE may be calculated based on the MCS supported by the URLLC service;

1.3.3 Beam related information.

Step 102, transmitting the uplink control information carried on the grant-free resource to a base station.

It should be noted that a specific implementation of Step 101 may include:

acquiring first configuration information of the control region;

Specifically, one manner of acquiring the first configuration information is: it is configured by the base station for the terminal and sent to the terminal. Specifically, the terminal receives the first configuration information of the control region sent by the base station through a first predetermined message. The first predetermined message comprises at least one of: a radio resource control (RRC) message, a physical layer signaling, and a medium access control (MAC) layer control element (CE). Another manner of acquiring the first configuration information is: it is predefined by a communication protocol. Specifically, the terminal acquires the first configuration information of the control region predefined by the communication protocol.

The UCI is carried on at least one control region of the grant-free resource according to the first configuration information.

Specifically, the first configuration information includes time-frequency domain resource allocation information of the control region, and/or a carrying manner of the UCI on the control region.

Different contents of the first configuration information are respectively described as follows.

1. The time-frequency domain resource allocation information of the control region includes at least one of: a size of the time-frequency domain resource of the control region, allocation of the time domain resource of the control region, and allocation of the frequency domain resource of the control region.

It should be noted that, each grant-free resource is configured with one or more control regions. The number of the control regions is $N_{control}$, the size of the time-frequency domain resource of the control region is $N_{time}*N_{freq}$, $N_{time}$, is a size of the time domain, and $N_{freq}$ is a size of the frequency domain, where $N_{control}$, $N_{time}$, and $N_{freq}$ are configured by the network or predefined; the above three may be group-specific, or may be UE-specific, or may be grant-free resource-specific.

Specifically, the allocation of the time domain resource of the control region includes that: a time domain resource position of the control region is adjacent to a time domain position of a reference signal of the grant-free resource; and/or in a case that there are at least two control regions, the time domain resources of at least two control regions are overlapped with or orthogonal to each other.

It should be noted that, the time domain position of the control region may be at any position in the grant-free resource, and the size of the time domain is pre-configured or predefined.

Figure 2:
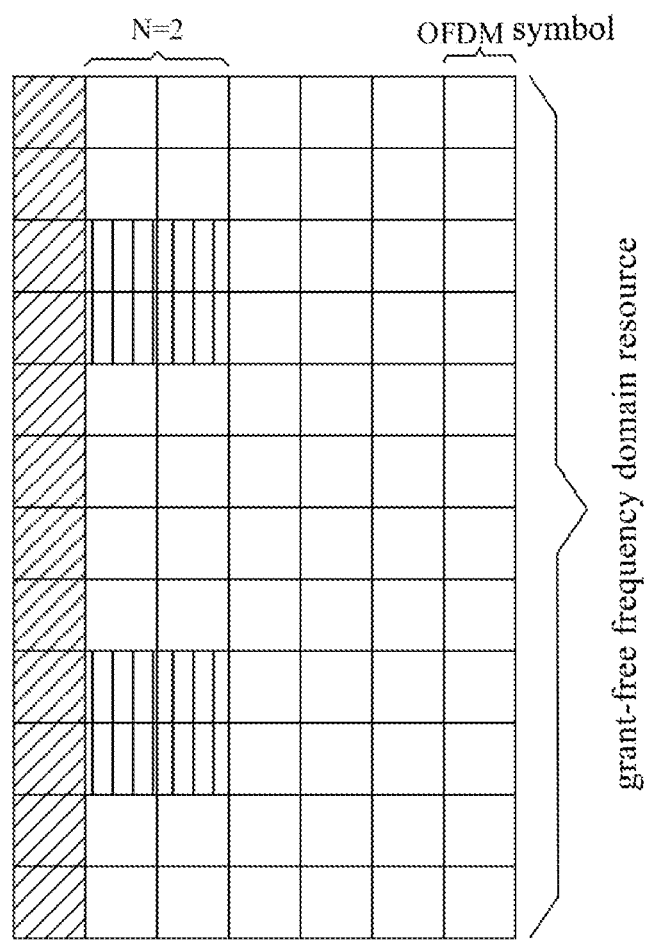
FIG. 2 illustrates a first schematic diagram of a time domain setting position of a control region.
Figure 3:
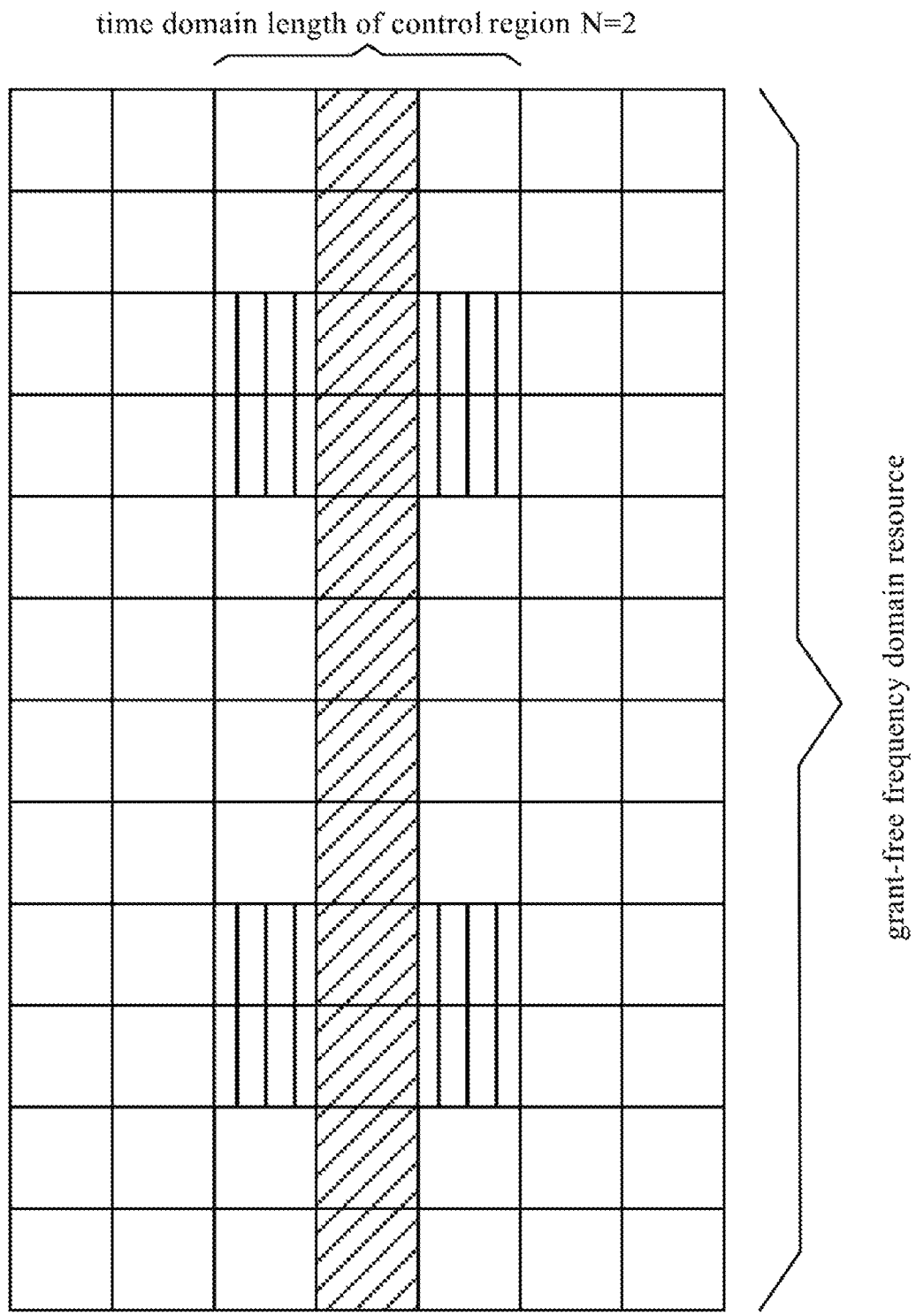
FIG. 3 illustrates a second schematic diagram of a time domain setting position of a control region.

In order to ensure the performance of the UCI, the time domain position of the control region is adjacent to the time domain position of the reference signal. Referring to FIGS. 2 and 3, in FIG. 2, the positions of the reference signals (RSs, i.e., the regions filled with slashes in the figure) of the grant-free resource are at the beginning of the data, and the control regions (i.e., the regions filled with vertical lines in the figure) are distributed in the time domain over the N symbols after the RSs; in FIG. 3, the positions of the RSs (or additional RSs, i.e., the regions filled with slashes in the figure) of the grant-free resource are in the middle of the data, and the control regions (i.e., the regions filled with vertical lines in the figure) are distributed in the time domain over the N symbols before and after the (additional) RSs.

Figure 4:
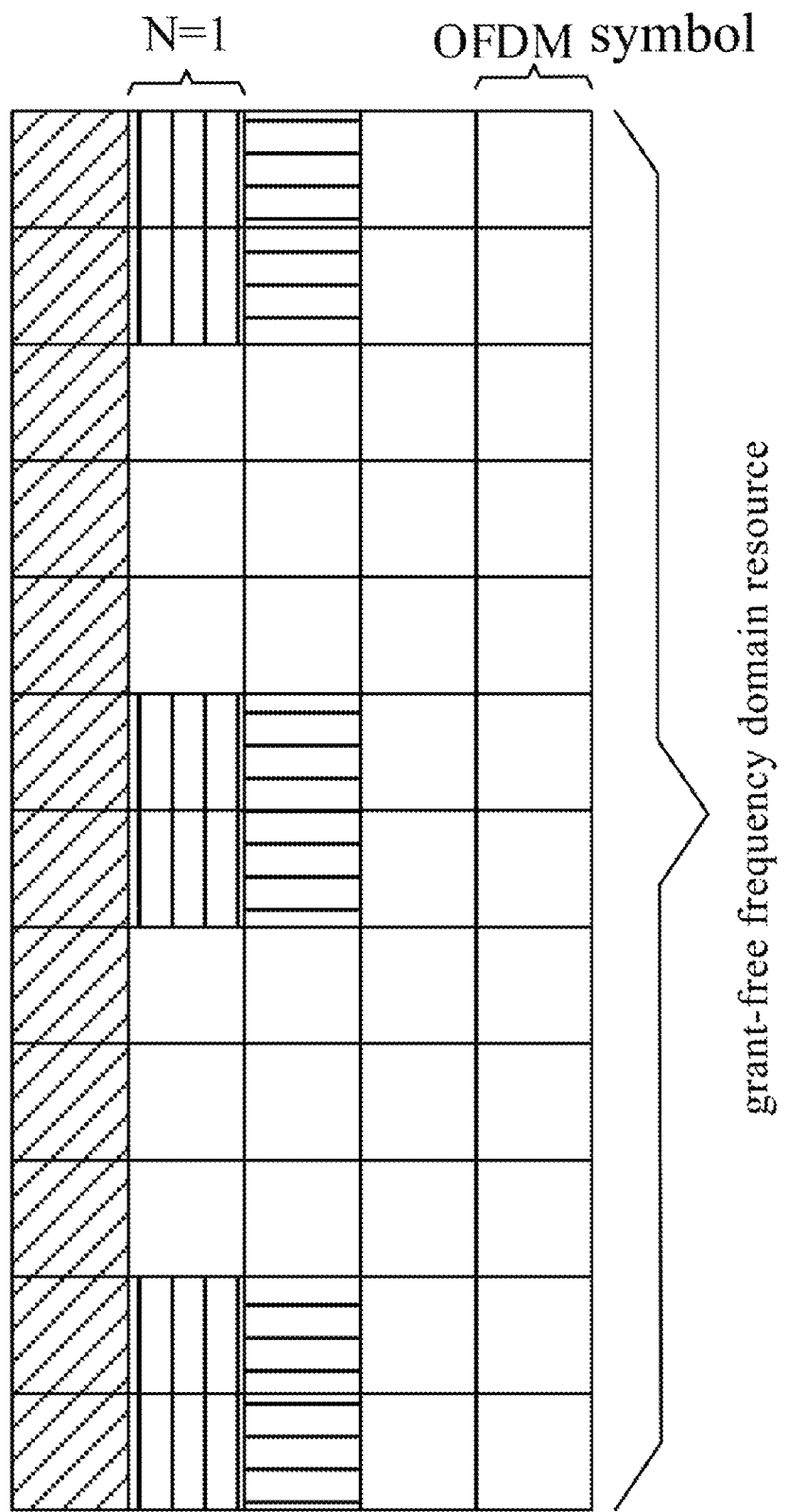
FIG. 4 illustrates a first schematic diagram of a time domain setting position of a different control region.
Figure 5:
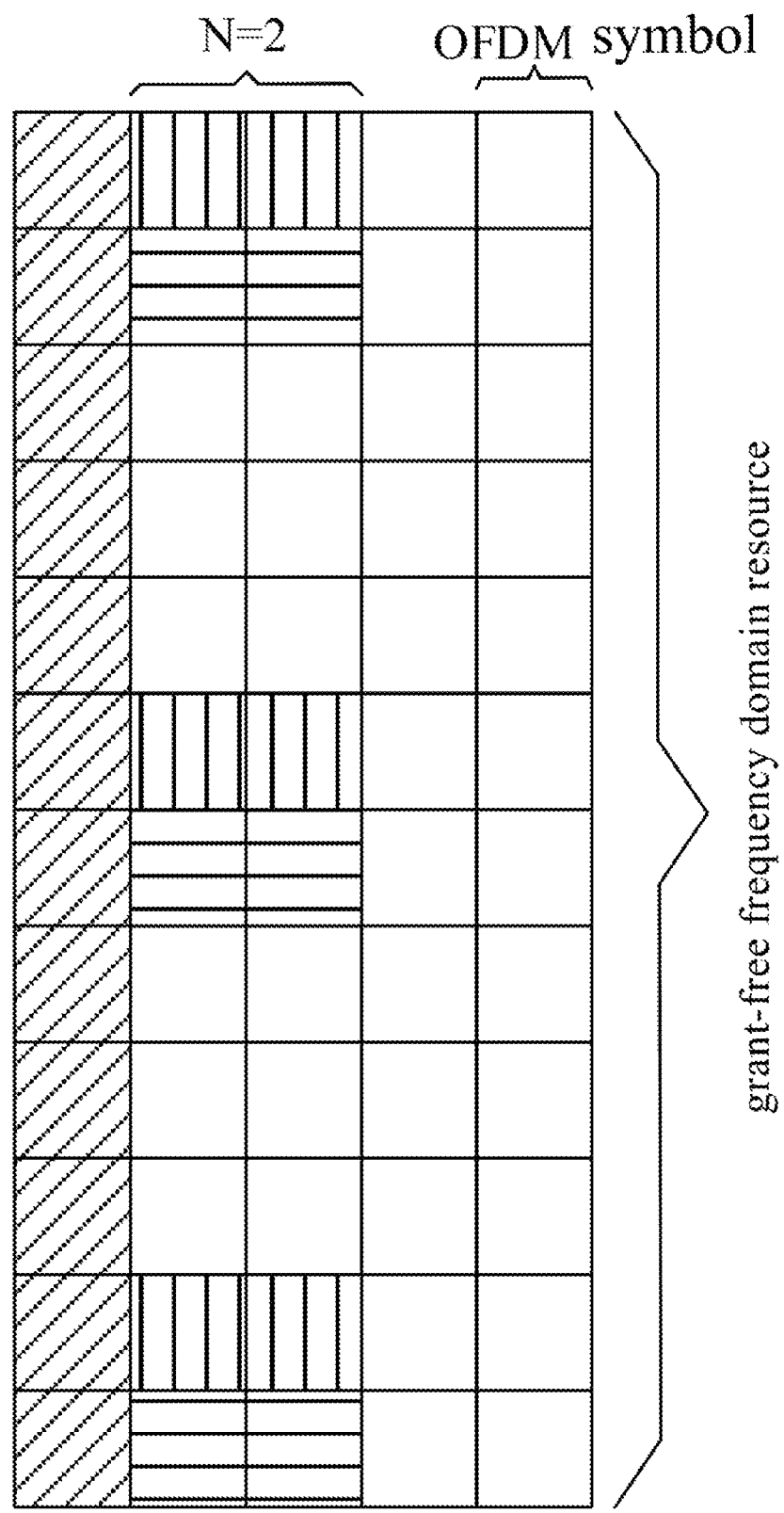
FIG. 5 illustrates a second schematic diagram of a time domain setting position of a different control region.

The time domain resources of multiple control regions may be orthogonal to each other, as shown in FIG. 4, a region filled with vertical lines represents a first control region, a region filled with horizontal lines represents a second control region, and the time domain position of the first control region is arranged before the time domain position of the second control region; the time domain resources of multiple regions may overlap, as shown in FIG. 5.

Specifically, the allocation of the frequency domain resource of the control region includes at least one of that:

the frequency domain resource of the control region is centralized or distributed;

a frequency domain resource position of the control region is located on a frequency domain resource position of a reference signal of the grant-free resource; and in a case that the frequency domain resource of the control region is distributed, the frequency domain resources of at least two control regions are allocated in a comb manner.

It should be noted that, the frequency domain position of the control region may be at any position in the grant-free resource, and the size of the frequency domain is pre-configured or predefined.

It should also be noted that, in order to obtain frequency diversity, a control region can contain multiple components, each of which is spaced apart in the frequency domain; specifically, the multiple components of the control region are located on (parts of) subcarriers where the reference signal is located; when there are multiple control regions, the multiple control regions may be distributed alternately in a comb structure. As shown in FIG. 5, the positions of the RSs are at the beginning of the data, the control regions are distributed in the time domain over the N symbols after the RSs, and different control regions are distributed alternately in a comb structure.

2. The carrying manner of the UCI on the control region includes at least one of that:

at least one piece of uplink control information is mapped to different positions of time-frequency domain resource of one control region;

in a case that there are at least two control regions, at least one piece of uplink control information is mapped to different control regions;

in a case that there are at least two control regions, different control regions carry uplink control information with different transmission parameters.

It should be noted that different control regions may be configured with different UCI transmission parameters. The UCI transmission parameters include a size of the time-frequency domain resource of the control region, a transmission power parameter, a modulation and coding scheme, etc.

Figure 6:
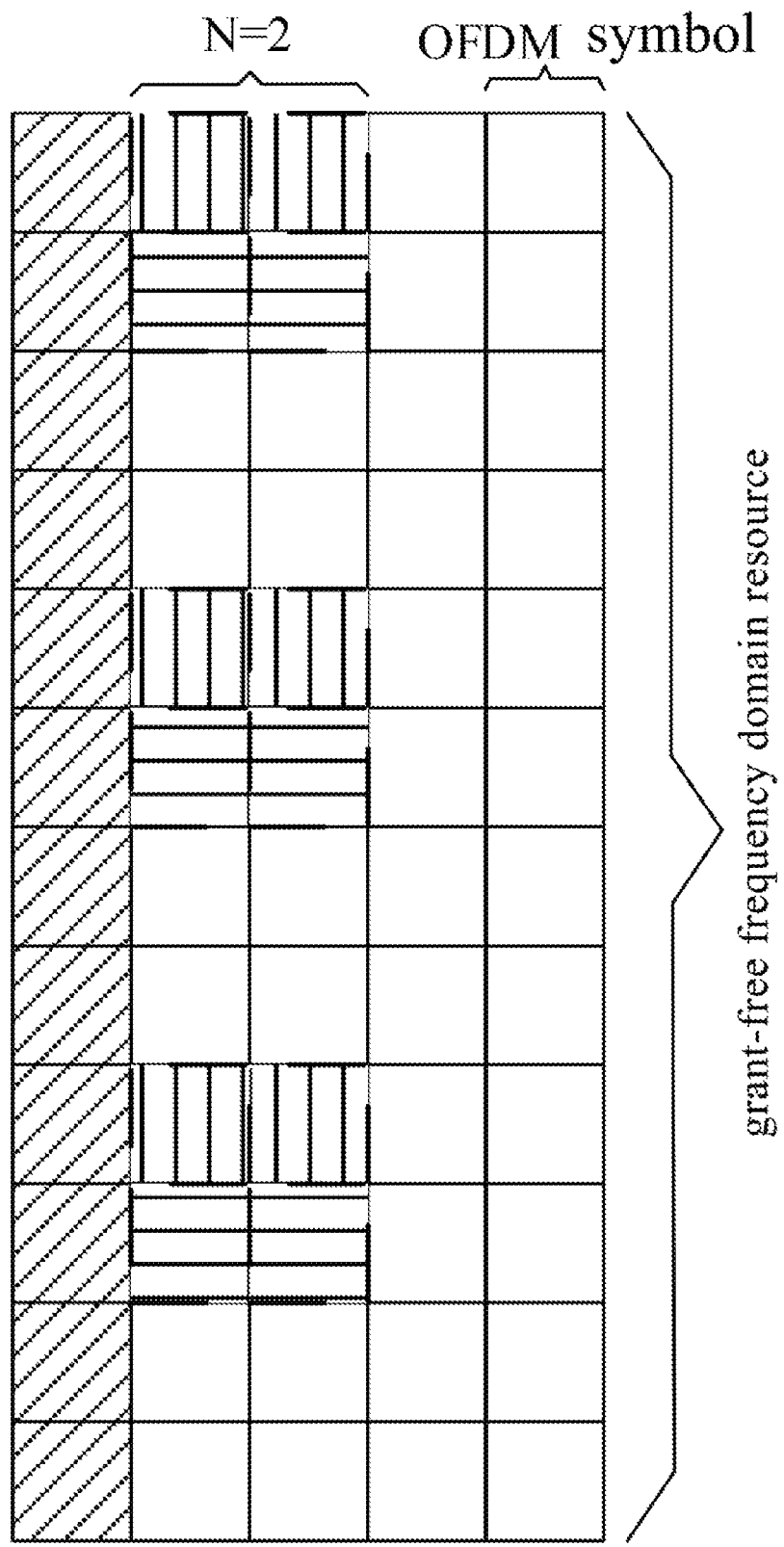
FIG. 6 illustrates a schematic diagram of setting positions of different UCI on the frequency domain.
Figure 7:
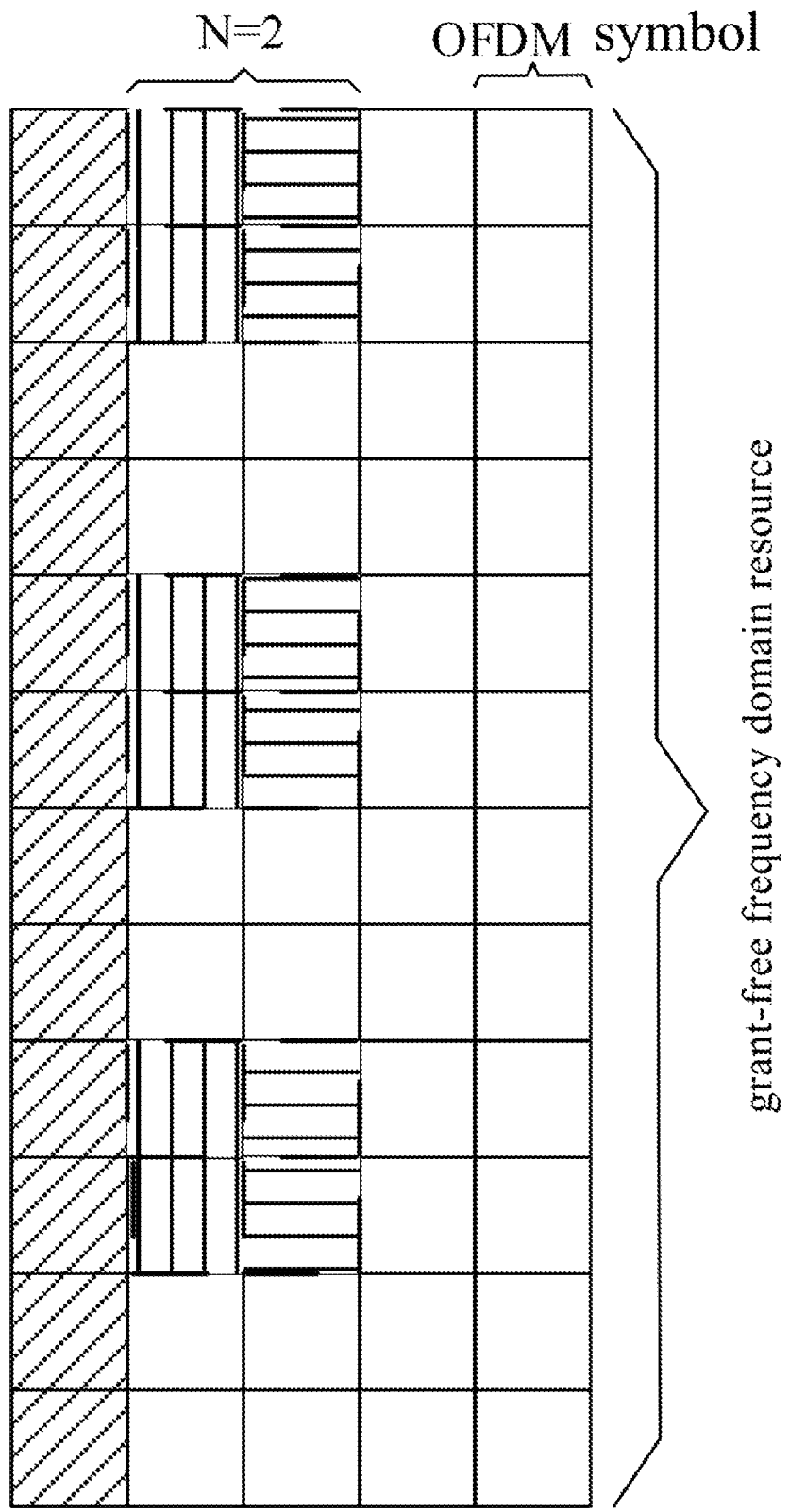
FIG. 7 illustrates a schematic diagram of setting positions of different UCI on the time domain.
Figure 8:
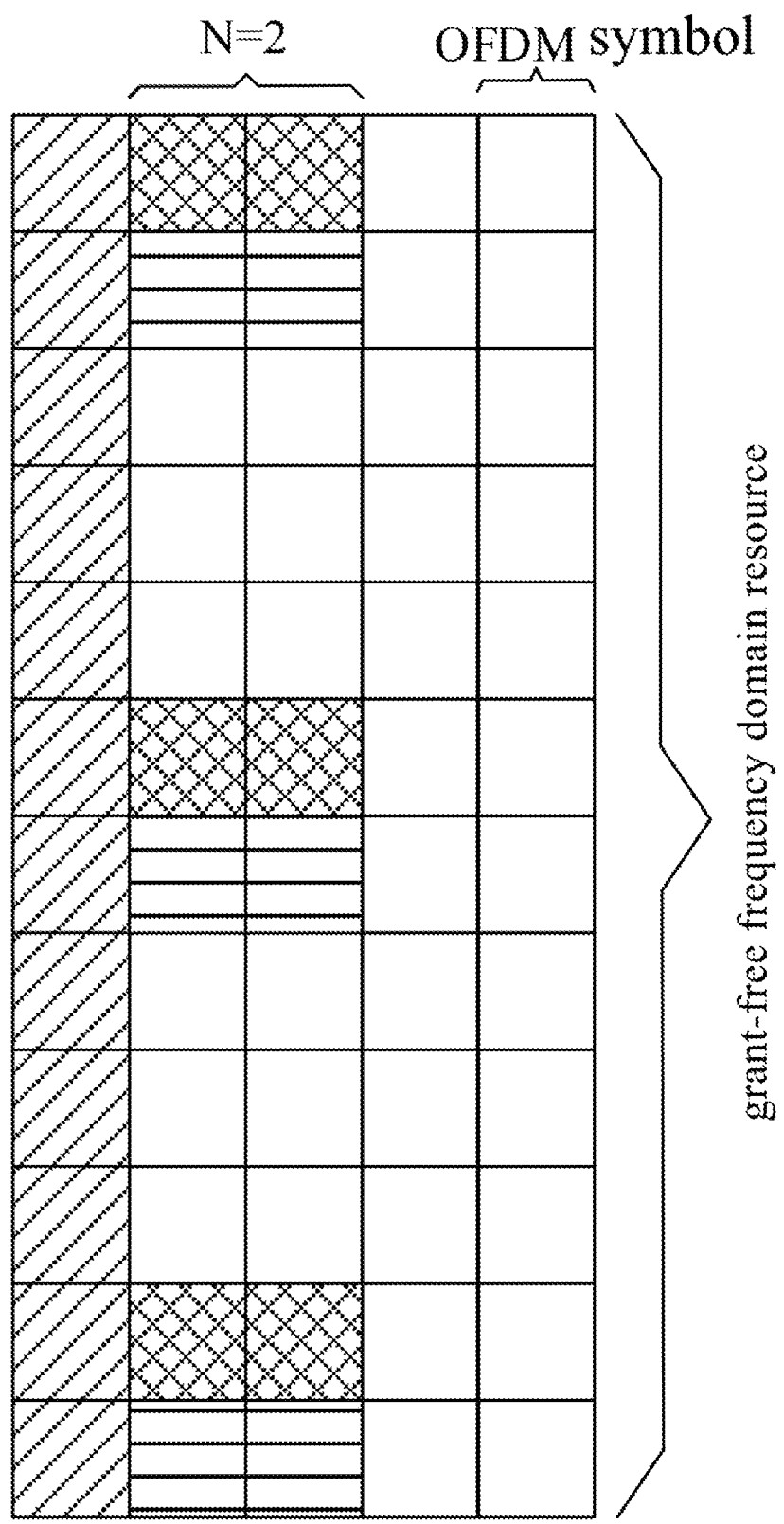
FIG. 8 illustrates a schematic diagram of setting positions of different UCI in the control region.

Specifically, the mapping manner of the UCI on the control region may be as follows:

A1. one or more pieces of UCI is mapped to one control region, and different pieces of UCI are differentiated by different time-frequency domain resources; as shown in FIGS. 6 and 7, FIG. 6 illustrates that different pieces of UCI have different positions on the frequency domain, and FIG. 7 illustrates that different pieces of UCI have different positions on the time domain;

A2. one or more pieces of UCI are mapped to multiple control regions, and different pieces of UCI are differentiated by the control regions; as shown in FIG. 8, FIG. 8 illustrates that different pieces of UCI are mapped to different control regions, a region filled with grid is a control region 1 to which a first piece of UCI is mapped, and a region filled with horizontal lines is a control region 2 to which a second piece of UCI is mapped.

It should be noted that at least one piece of UCI may be mapped to different control regions according to the priorities of the control regions.

Figure 9:
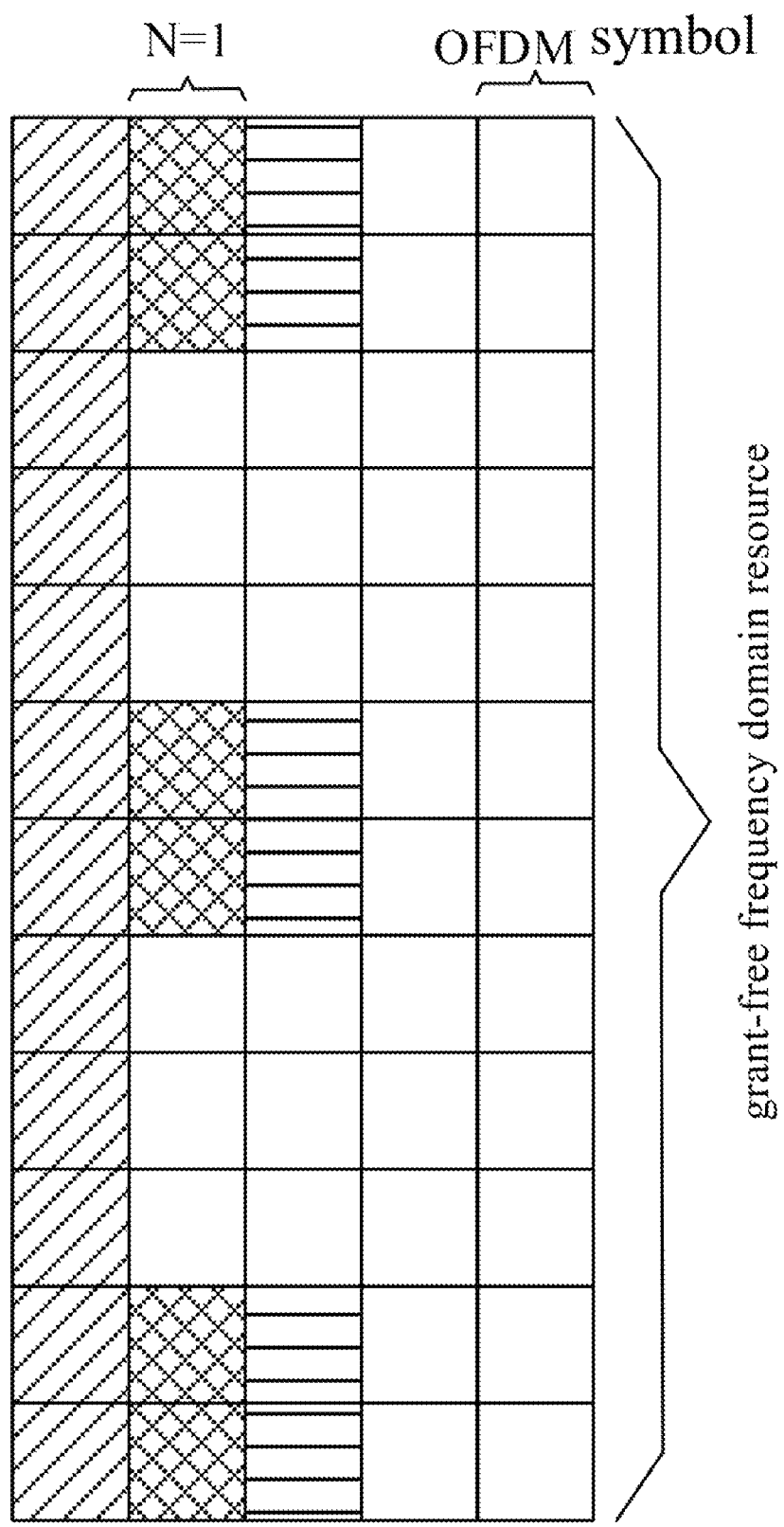
FIG. 9 illustrates a schematic diagram of setting positions of UCI of different priorities in the control region.

Since the priorities of the control regions may be different, the priority may be determined according to the size of the time-frequency domain resource of the control region, the modulation and coding scheme of the control region, the transmission power, and the like. For example, the mapping of some important UCIs which have a higher priority are preferentially ensured, for example, the UCI related to the transmission on the grant-free resource is mapped to the control region with a higher priority, and other UCI is mapped to the control region with a lower priority. As shown in FIG. 9, it illustrates that the UCI of different priorities are mapped to different control regions, a region filled with grid is a control region 1 to which the UCI with a higher priority is mapped, and a region filled with horizontal lines is a control region 2 to which the UCI with a lower priority is mapped.

It should be noted that the grant-free resource generally needs to carry data therein. In order to be able to be carried on a control region of the grant-free resource, the UCI is configured to be multiplexed with the data in the grant-free resource. Specifically, the terminal is configured to acquire second configuration information of a multiplexing manner of the UCI and the data on the grant-free resource, and perform the multiplexing of the UCI and the data on the grant-free resource according to the second configuration information, so as to carry the UCI in at least one control region of the grant-free resource; then, the terminal transmits the UCI and the data carried on the grant-free resource to the base station.

Specifically, a first manner for the terminal to acquire the second configuration information is: the base station configures the second configuration information for the terminal and sends it to the terminal. Specifically, the terminal receives the second configuration information sent by the base station through a third predetermined message. The third predetermined message includes at least one of: an RRC message, a physical layer signaling, and a MAC CE. Another manner to acquire the second configuration information is: the communication protocol predefines the second configuration information. Specifically, the terminal acquires the second configuration information predefined by the communication protocol.

Specifically, the second configuration information includes: a multiplexing manner of puncturing the data and/or a multiplexing manner of rate matching the UCI and the data.

Figure 10:
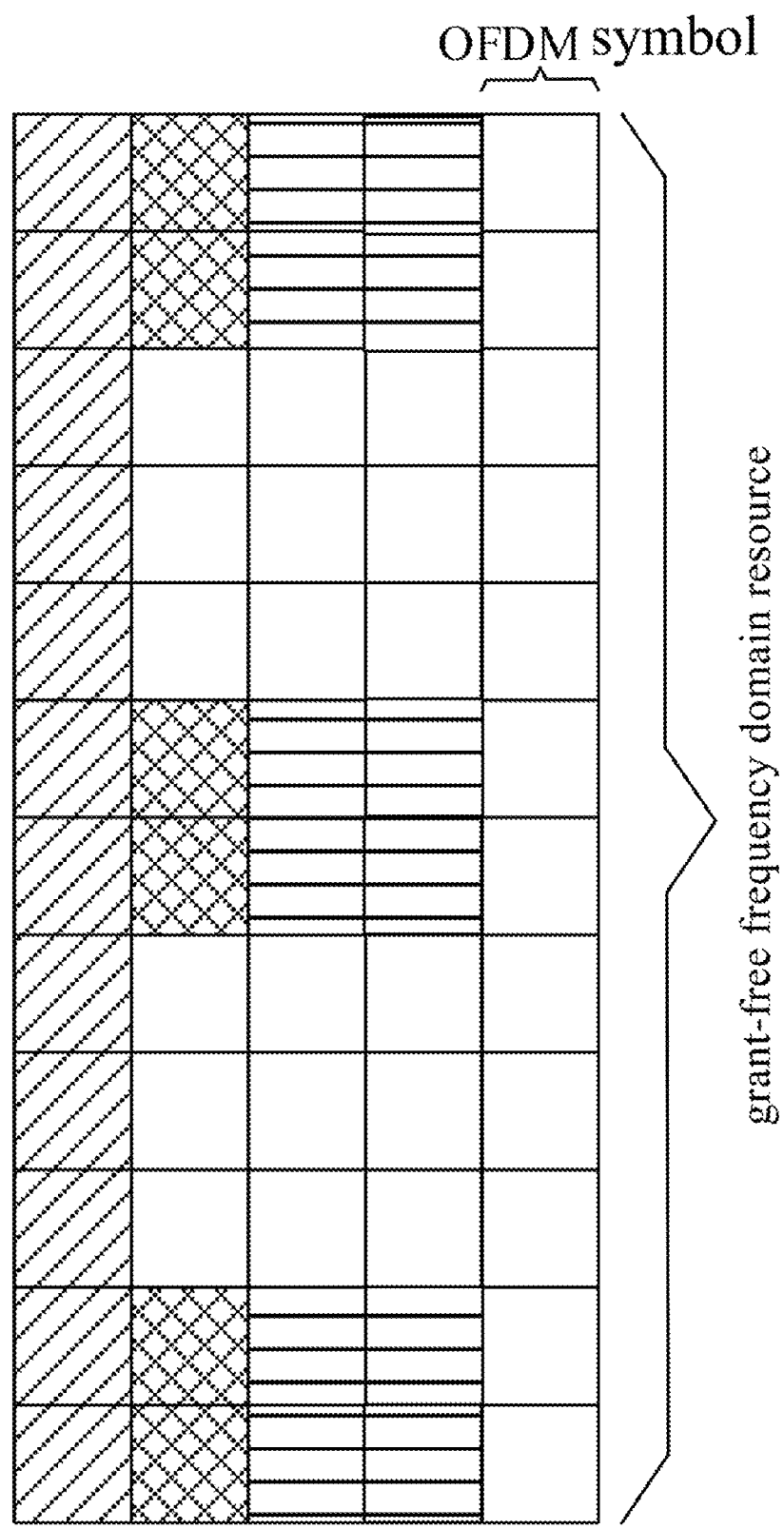
FIG. 10 illustrates a schematic diagram of the setting of a multiplexing manner of UCI and data in different control regions.

It should be noted that, in the control region of the grant-free resource, the UCI is multiplexed with the data in a puncturing multiplexing manner or a rate-matching multiplexing manner according to a pre-configured method or a predefined rule. In a specific application, the terminal may select one of the following manners to perform the multiplexing of the UCI and the data:

B1: puncturing the data on a corresponding resource of the control region, and transmitting the UCI by the punctured region;

B2: rate-matching the data and the UCI, and transmitting the UCI on the corresponding resource of the control region;

B3: some of the UCI is multiplexed with the data in the puncturing multiplexing manner, while other UCI in the rate-matching multiplexing manner. As shown in FIG. 10, a region filled with grid is a control region 1 in which the UCI is carried on the puncturing multiplexing manner, and a region filled with horizontal lines is a control region 2 in which the UCI is carried on the rate-matching multiplexing manner.

Specifically, the further implementation of B3 includes at least one of the following:

B31: selecting one of the two multiplexing manners according to the predefined priority of the UCI;

for example, the puncturing multiplexing manner is applied to the UCI with a higher priority (such as the HARQ process identification, HPID), while the rate-matching multiplexing manner is applied to the UCI with a lower priority (such as the CQI);

B32: selecting one of the two multiplexing manners according to the pre-configured or predefined size of the time-frequency domain resources of the UCI, and/or the ratio of the number of resources occupied by the UCI to the number of grant-free resources;

for example, when the UCI occupies a small size of the time-frequency domain resources during transmission or the UCI requires a small percentage of the total number of the grant-free resources, the UCI is carried on the resource block of the data in the puncturing multiplexing manner; when the UCI occupies a large size of the time-frequency domain resources during transmission or the UCI requires a large percentage of the total number of the grant-free resources, the UCI is multiplexed with the data in the rate-matching multiplexing manner;

for example, assuming that the size of time domain and the size of frequency domain of the grant-free resource are A and B, the size of time domain and the size of frequency domain of the resource required by the UCI are N and M (N<=A, M<=B). If $(N*M)/(A*B)<\rho$ (for example, $\rho=1/4$), the UCI is multiplexed in the puncturing multiplexing manner on the grant-free resource; if $(N*M)/(A*B)>\rho$ (for example, $\rho=1/4$), the UCI is multiplexed in the rate-matching multiplexing manner on the grant-free resource; where p may be predefined or pre-configured.

It should be noted that, in order to achieve resource multiplexing, one grant-free resource may be shared by multiple terminals. Therefore, one grant-free resource may carry the UCI of multiple terminals. Accordingly, when a terminal performs carrying of the UCI, it needs to know format information of the UCI first. Specifically, a specific implementation of Step 101 may include: acquiring the format information of the UCI; and carrying, according to the format information of the UCI, the uplink control information (UCI) on at least one control region of the grant-free resource.

Specifically, a first manner for the terminal to acquire the format information of the UCI is: the base station configures the format information for the terminal and sends it to the terminal. Specifically, the terminal receives the format information of the UCI sent by the base station through a second predetermined message. The second predetermined message includes at least one of: an RRC message, a physical layer signaling, and a MAC CE. Another manner to acquire the format information of the UCI is: the communication protocol predefines the format information. Specifically, the terminal acquires the format information of the UCI predefined by the communication protocol.

Specifically, the format information of the UCI includes: using at least one of frequency division multiplexing (FDM), time division multiplexing (TDM), and code division multiplexing (CDM) to perform multiplexing of the UCI of different terminals on the grant-free resource.

Further, in a case that the format information of the uplink control information includes using the frequency division multiplexing and/or the time division multiplexing to perform multiplexing of the uplink control information of different terminals on the grant-free resource, the time domain resource and/or the frequency domain resource used by the uplink control information of different terminals are resources shared with data in the grant-free resources, or the time domain resource and/or the frequency domain resource used by the uplink control information of different terminals are dedicated resources in the grant-free resources.

Figure 11:
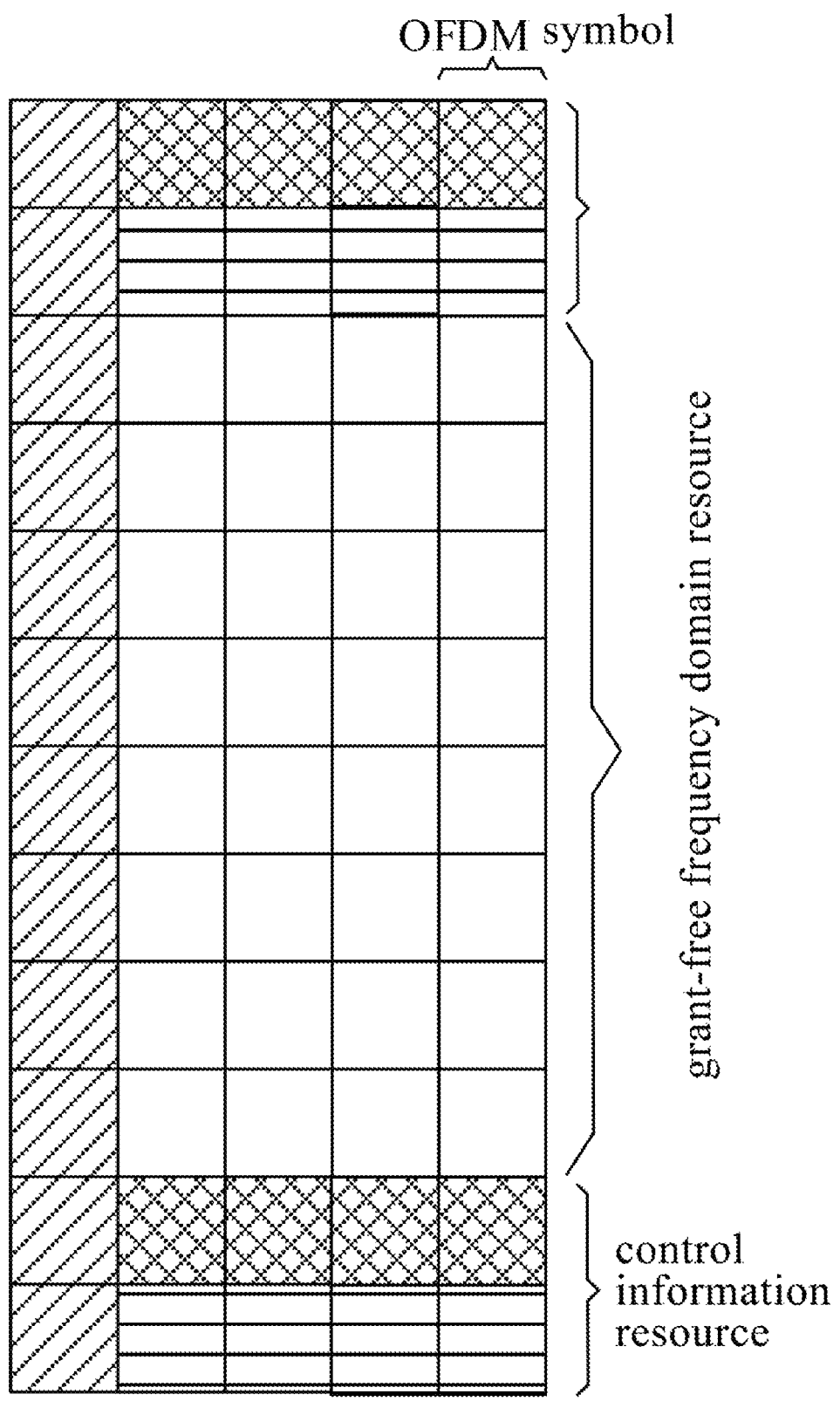
FIG. 11 illustrates a schematic diagram of setting positions of UCI of different terminals in the time-frequency domain.
Figure 12:
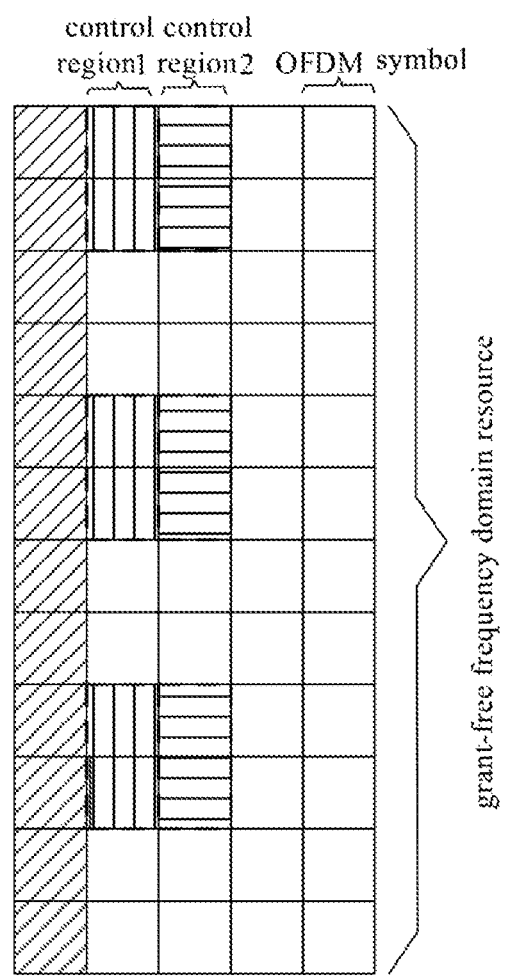
FIG. 12 illustrates a schematic diagram of setting positions of UCI of different terminals in the control region.

It should be noted that, when performing configuration, a part of time-frequency domain resource is reserved for the UCI of a group of terminals. If there is no UCI transmitted on the reserved resource, data may be transmitted (to improve resource utilization; however, this will cause mutual interference between the data and the UCI of users), or data may not be transmitted (to ensure the UCI transmission and improve reliability; however, the resource utilization will be reduced). Specifically, in a reserving manner: a part of resource not carrying data on the grant-free resource may be reserved, and different terminals are differentiated by FDM or TDM of the resource. As shown in FIG. 11, a region filled with grid is used to carry the UCI of the terminal A, and a region filled with horizontal lines is used to carry the UCI of the terminal B. Another manner is to reserve a part of the resource inside the grant-free resource, and distinguish different terminals by FDM or TDM of the resource. As shown in FIG. 12, a region filled with vertical lines is the control region 1 for carrying the UCI of the terminal A, and a region filled with horizontal lines is the control region 2 for carrying the UCI of the terminal B.

Further, in a case that the format information of the UCI includes using the code division multiplexing to perform multiplexing of the UCI of different terminals on the grant-free resource, sequences used by the UCI of different terminals are different from each other; or payload of the UCI of different terminals is processed by a predetermined sequence;

wherein the predetermined sequence includes: an orthogonal cover code (OCC) and/or a scrambling sequence.

It should be noted that, when the grant-free resource is shared by multiple terminals, the UCI of different terminals needs to be distinguishable or capable of being demodulated/decoded independently. Specifically, at least one of the following manners may be adopted:

C1: the UCI of different terminals uses different sequences;

if the UCI is transmitted by using different sequences, S different sequences can carry information of up to $\log_2 S$ bits, and the sequences adopted by the UCI of different terminals can be differentiated by different OCCs or cyclic shift;

C2: the UCI payload is differentiated using orthogonal code in the time domain or frequency domain;

if the UCI is transmitted by the payload method, the payload of S bits can carry information of up to $\log_2 S$ bits, and the coded bits or modulation symbols of the UCI payload of different terminals are differentiated by orthogonal codes;

C3: different scrambling sequences are used for UCI payload;

for example, the payload sequence is scrambled directly, or scrambled with a cyclic redundancy check (CRC) (i.e., adding a CRC to the payload).

It should be noted that, in order to improve the receiving performance of the base station, the terminal retransmit the data in the grant-free resource. If the UCI is carried on each retransmission, the UCI has a large overhead, and the number of retransmissions of the UCI carried by the control region may be configured to be different from the number of retransmissions of the data.

Thus, a specific implementation of Step 102 is: to acquire retransmission configuration information of the uplink control information of the control region; and retransmit the UCI and the data carried on the grant-free resource to the base station;

wherein the retransmission configuration information includes that: the number of retransmissions of the uplink control information of the control region is less than or equal to the number of retransmissions of the data in the grant-free resource.

It should be noted that, if the base station misses the grant-free transmission carrying the UCI, it will lead to an error of grant-free transmission. In order to increase the reliability of the UCI, for example, a lower coding rate is adopted for the UCI; if time hopping or frequency hopping is supported during the retransmission, the hopping may also be performed on the UCI during the repeated multiple transmissions.

Figure 13:
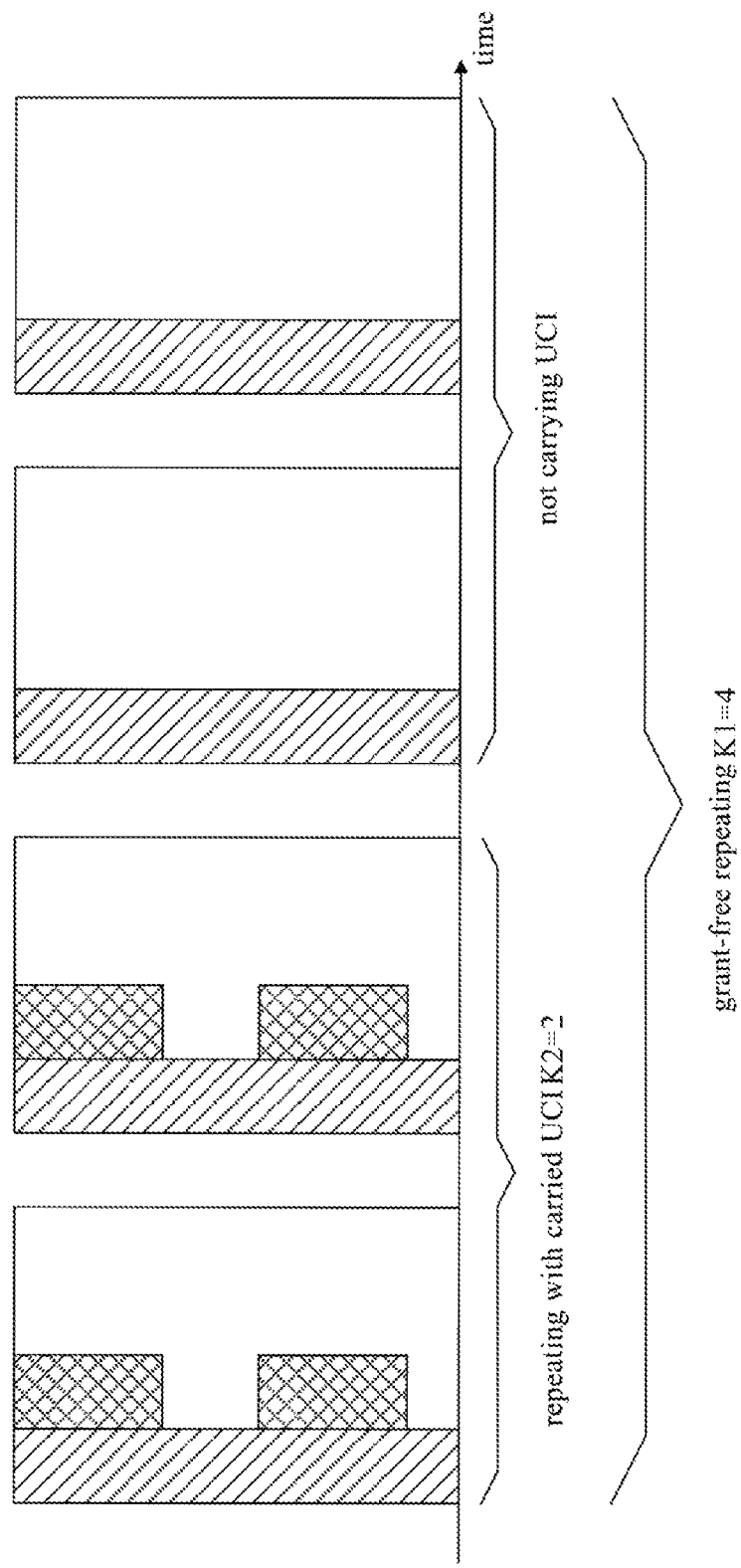
FIG. 13 illustrates a schematic diagram of a relationship between UCI retransmission and data retransmission.

For example, if the terminal is configured to transmit data multiple times, the number of times is K1, and the UCI transmission is also repeated multiple times, the number of repeating times is K2, and K2 is less than or equal to K1. When K2=K1, the terminal carries the UCI in each transmission of the grant-free resource. When K2<K1, the terminal carries the UCI in the first K2 transmissions in the grant-free resource. For example, referring to FIG. 13, in FIG. 13, the terminal configures 4 retransmissions, the number of retransmissions of the UCI is 2, and the terminal carries the UCI in the first two transmissions in the grant-free resource.

It should be noted that, the information transmission method in some embodiments of the present disclosure can realize fast and reliable decoding of the UCI while improving the communication process and ensuring the reliability of the network communication by multiplexing the UCI on the grant-free resource.

Figure 14:
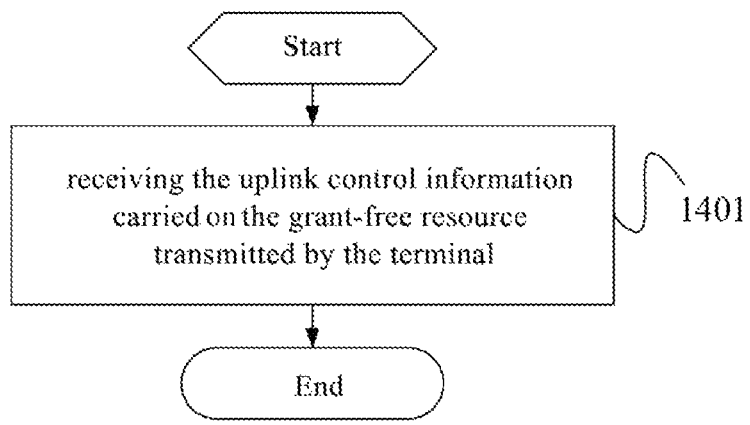
FIG. 14 illustrates a second schematic flow chart showing an information transmission method according to some embodiments of the present disclosure.

As shown in FIG. 14, some embodiments of the present disclosure provides an information transmission method which is applied to a base station and includes Step 1401.

Step 1401, receiving the uplink control information carried on the grant-free resource transmitted by the terminal; wherein the uplink control information is carried on at least one control region of the grant-free resource.

Further, before Step 1401, the method includes: sending a first configuration information of the control region to the terminal through a first predetermined message; wherein the first predetermined message includes at least one of: a radio resource control (RRC) message, a physical layer signaling, and a medium access control (MAC) layer control element (CE).

Specifically, the first configuration information includes: time-frequency domain resource allocation information of the control region, and/or a carrying manner of the uplink control information on the control region.

Further, in a case that the first configuration information includes the time-frequency domain resource allocation information of the control region, the time-frequency domain resource allocation information of the control region includes at least one of: a size of the time-frequency domain resource of the control region, allocation of time domain resource of the control region, and allocation of frequency domain resource of the control region.

Further, in a case that time-frequency domain resource allocation information of the control region includes the allocation of the time domain resource of the control region, the allocation of the time domain resource of the control region includes that: a time domain resource position of the control region is adjacent to a time domain position of a reference signal of the grant-free resource; and/or, in a case that there are at least two control regions, the time domain resources of at least two control regions are overlapped with or orthogonal to each other.

Further, in a case that time-frequency domain resource allocation information of the control region includes the allocation of the frequency domain resource of the control region, the allocation of the frequency domain resource of the control region includes at least one of that: the frequency domain resource of the control region is centralized or distributed; the frequency domain resource of the control region are located on a frequency domain resource position of a reference signal of the grant-free resource; and, in a case that the frequency domain resource of the control region is distributed, the frequency resources of at least two control regions are allocated in a comb manner.

Specifically, in a case that the first configuration information includes the carrying manner of the uplink control information on the control region, the carrying manner of the uplink control information on the control region includes at least one of that: at least one piece of uplink control information is mapped to different time-frequency domain resource positions of one control region; in a case that there are at least two control regions, at least one piece of uplink control information is mapped to different control region; in a case that there are at least two control regions, different control regions carry uplink control information with different transmission parameters.

Specifically, in a case that there are at least two control regions, an implementation of mapping at least one piece of uplink control information to different control region is: mapping at least one piece of uplink control information to different control region according to a priority of the control region; wherein, the priority of the control region is determined according to a predetermined parameter, and the predetermined parameter includes at least one of: a size of the time-frequency domain resource of the control region, a modulation and coding scheme, and a transmission power.

Further, before Step 1401, the method includes: sending format information of the uplink control information to the terminal through a second predetermined message; wherein the second predetermined message comprises at least one of: an RRC message, a physical layer signaling, and a MAC CE.

Specifically, the format information of the uplink control information includes: using at least one of frequency division multiplexing, time division multiplexing, and code division multiplexing to perform multiplexing of the uplink control information of different terminals on the grant-free resource.

Further, in a case that the format information of the uplink control information includes using the frequency division multiplexing and/or the time division multiplexing to perform multiplexing of the uplink control information of different terminals on the grant-free resource, the time domain resource and/or the frequency domain resource used by the uplink control information of different terminals are resources shared with data in the grant-free resources, or the time domain resource and/or the frequency domain resource used by the uplink control information of different terminals are dedicated resources in the grant-free resources.

Further, in a case that the format information of the uplink control information includes using the code division multiplexing to perform multiplexing of the uplink control information of different terminals on the grant-free resource, sequences used by the uplink control information of different terminals are different from each other; or payload of the uplink control information of different terminals is processed by a predetermined sequence; wherein the predetermined sequence includes: an orthogonal cover code (OCC) and/or a scrambling sequence.

Further, an implementation of Step 1401 is: receiving the uplink control information and data carried on the grant-free resource transmitted by the terminal.

Further, before the step of receiving the uplink control information and the data carried on the grant-free resource transmitted by the terminal, the method includes: sending a second configuration information of a multiplexing manner of the uplink control information and the data on the grant-free resource to the terminal through a third predetermined message; wherein the third predetermined message includes at least one of: an RRC message, a physical layer signaling, and a MAC CE.

Specifically, the second configuration information includes: a multiplexing manner of puncturing the data and/or a multiplexing manner of rate matching the uplink control information and the data.

Specifically, the step of receiving the uplink control information and the data carried on the grant-free resource transmitted by the terminal includes: sending retransmission configuration information of the uplink control information of the control region to the terminal; receiving the uplink control information and the data carried on the grant-free resource retransmitted by the terminal; wherein the retransmission configuration information includes that: the number of retransmissions of the uplink control information of the control region is less than or equal to the number of retransmissions of the data in the grant-free resource.

It should be noted that, all the descriptions on the base station side in the foregoing embodiments are applicable to the embodiment of the information transmission method applied to the base station side, and the same technical effects can also be achieved.

Figure 15:
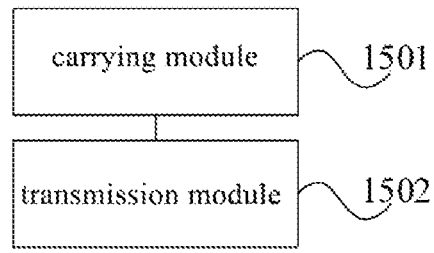
FIG. 15 illustrates a schematic diagram of modules of a terminal according to some embodiments of the present disclosure.

As shown in FIG. 15, some embodiments of the present disclosure provides a terminal which includes: a carrying module 1501 for carrying uplink control information on at least one control region of a grant-free resource; and a transmission module 1502 for transmitting the uplink control information carried on the grant-free resource to a base station.

Further, the carrying module 1501 includes: a first acquisition unit for acquiring first configuration information of the control region; a first carrying unit for carrying the uplink control information on at least one control region of the grant-free resource according to the first configuration information.

Optionally, the first acquisition unit is configured to: receive the first configuration information of the control region sent by the base station through a first predetermined message; or acquire the first configuration information of the control region predefined by a communication protocol; wherein the first predetermined message includes at least one of: a radio resource control (RRC) message, a physical layer signaling, and a medium access control (MAC) layer control element (CE).

Specifically, the first configuration information includes: time-frequency domain resource allocation information of the control region, and/or a carrying manner of the uplink control information on the control region.

Further, in a case that the first configuration information includes the time-frequency domain resource allocation information of the control region, the time-frequency domain resource allocation information of the control region includes at least one of: a size of the time-frequency domain resource of the control region, allocation of time domain resource of the control region, and allocation of frequency domain resource of the control region.

Further, in a case that time-frequency domain resource allocation information of the control region includes the allocation of the time domain resource of the control region, the allocation of the time domain resource of the control region includes that: a time domain resource position of the control region is adjacent to a time domain position of a reference signal of the grant-free resource; and/or in a case that there are at least two control regions, the time domain resources of at least two control regions are overlapped with or orthogonal to each other.

Further, in a case that time-frequency domain resource allocation information of the control region includes the allocation of the frequency domain resource of the control region, the allocation of the frequency domain resource of the control region includes at least one of that: the frequency domain resource of the control region is centralized or distributed; the frequency domain resource of the control region is located on a frequency domain resource position of a reference signal of the grant-free resource; and in a case that the frequency domain resource of the control region is distributed, the frequency resources of at least two control regions are allocated in a comb manner.

Further, in a case that the first configuration information includes the carrying manner of the uplink control information on the control region, the carrying manner of the uplink control information on the control region includes at least one of that: at least one piece of uplink control information is mapped to different time-frequency domain resource positions of one control region; in a case that there are at least two control regions, at least one piece of uplink control information is mapped to different control region; in a case that there are at least two control regions, different control regions carry uplink control information with different transmission parameters.

Further, in a case that there are at least two control regions, at least one piece of uplink control information is mapped to different control regions by: mapping at least one piece of uplink control information to different control regions according to a priority of each control region; wherein, the priority of the control region is determined according to a predetermined parameter, and the predetermined parameter includes at least one of: a size of the time-frequency domain resource of the control region, a modulation and coding scheme, and a transmission power.

Specifically, the carrying module 1501 includes: a second acquisition unit for acquiring format information of the uplink control information; and a second carrying unit for carrying the uplink control information on at least one control region of the grant-free resource according to the format information of the uplink control information.

Optionally, the second acquisition unit is configured to: acquire the format information of the uplink control information sent by the base station through a second predetermined message; or acquire the format information of the uplink control information predefined by a communication protocol; wherein the second predetermined message includes at least one of: an RRC message, a physical layer signaling, and a MAC CE.

Specifically, the format information of the uplink control information includes: using at least one of frequency division multiplexing, time division multiplexing, and code division multiplexing to perform multiplexing of the uplink control information of different terminals on the grant-free resource.

Specifically, the transmission module 1502 is configured to: transmit the uplink control information and data carried on the grant-free resource to the base station.

Further, the carrying module 1501 includes: a third acquisition unit for acquiring second configuration information of a multiplexing manner of the uplink control information and the data on the grant-free resource; a third carrying unit for performing multiplexing of the uplink control information and the data on the grant-free resource according to the second configuration information, so as to carry the uplink control information in at least one control region of the grant-free resource.

Optionally, the third acquisition unit is configured to: acquire the second configuration information of the multiplexing manner of the uplink control information and the data on the grant-free resource sent by the base station through a third predetermined message; or acquire the second configuration information of the multiplexing manner of the uplink control information and the data on the grant-free resource predefined by a communication protocol; wherein the third predetermined message comprises at least one of: an RRC message, a physical layer signaling, and a MAC CE.

Specifically, the second configuration information includes: a multiplexing manner of puncturing the data and/or a multiplexing manner of rate matching the uplink control information and the data.

Further, the transmission module includes: a fourth acquisition unit for acquiring retransmission configuration information of the uplink control information of the control region; a transmission unit for retransmitting the uplink control information and the data carried on the grant-free resource to the base station according to the retransmission configuration information; wherein the retransmission configuration information includes that: the number of retransmissions of the uplink control information of the control region is less than or equal to the number of retransmissions of the data in the grant-free resource.

It should be noted that, the terminal embodiment is a terminal corresponding to the above information transmission method applied to the terminal side. All the implementations of the foregoing embodiment are applicable to the terminal embodiment, and the same technical effects can also be achieved.

Some embodiments of the present disclosure further provide a terminal which includes: a storage, a processor and a computer program stored in the storage and running in the processor, the computer program, when executed by the processor, is capable of causing the processor to achieve the processes in the forgoing information transmission method applied to the terminal side, the same technical effects can also be achieved, and will not be repeated here in order to avoid repetition.

Some embodiments of the present disclosure further provide a computer readable storage medium, wherein the computer readable storage medium stores thereon a computer program which, when executed by a processor, is capable of causing the processor to achieve the processes in the forgoing information transmission method applied to the terminal side, the same technical effects can also be achieved, and will not be repeated here in order to avoid repetition. The computer readable storage medium may be a volatile computer readable storage medium or a nonvolatile computer readable storage medium or a transient computer readable storage medium such as a read-only memory (ROM), a random access memory (RAM), a magnetic disk or an optical disk or the like.

Figure 16:
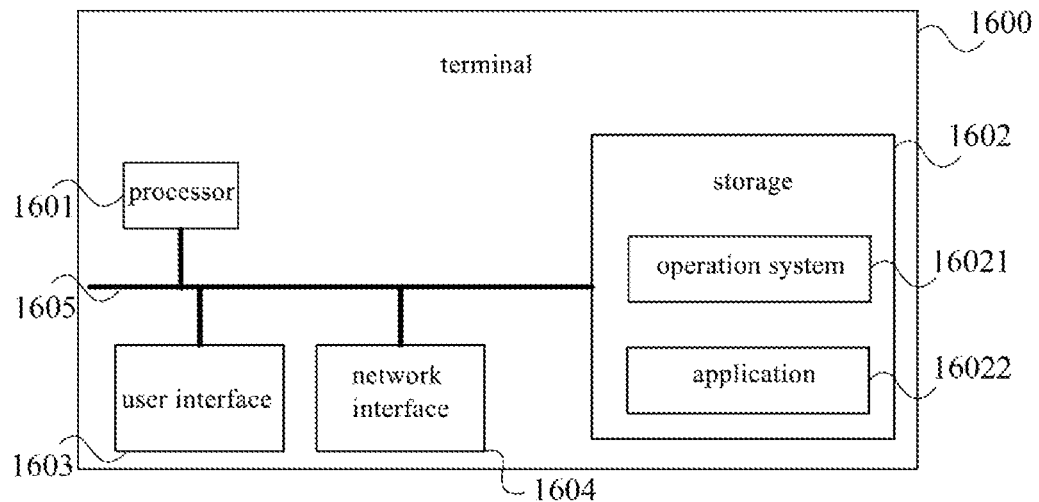
FIG. 16 illustrates a structural block diagram of a terminal according to some embodiments of the present disclosure.

As shown in FIG. 16, it is a structural block diagram of a terminal according to the present disclosure. An application entity of the information transmission method of the present disclosure will be specifically described below in conjunction with the figure.

The terminal 1600 shown in FIG. 16 includes: at least one processor 1601, a storage 1602, at least one network interface 1604, and a user interface 1603. The components in the terminal 1600 are coupled with each other by a bus system 1605. It will be appreciated that the bus system 1605 is used to achieve the connection communication between these components. The bus system 1605 includes a power bus, a control bus, and a status signal bus in addition to the data bus. However, for clarity of description, various buses are labeled as bus system 1605 in FIG. 16.

Wherein, the user interface 1603 may include a display, a keyboard or a pointing device (e.g., a mouse, a track ball, a touch pad or a touch screen, etc).

It will be appreciated that, the storage 1602 in some embodiments of the present disclosure may be either a volatile memory or a non-volatile memory, or may include both. Wherein the non-volatile memory may be a read-only memory (ROM), a Programmable ROM (PROM), an Erasable PROM (EPROM), an Electrically EPROM (EEPROM) or a flash memory. The volatile memory may be a Random Access Memory (RAM) that acts as an external cache. By way of example and not limitation, RAMs of many forms are available, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SDRAM), and Direct Rambus RAM (DRRAM). The storage 1602 of the systems and methods described herein is intended to include, without being limited to, these and any other suitable types of memories.

In some implementations, the storage 1602 stores the following elements, executable modules or data structures, or a subset thereof, or extended set thereof: an operating system 16021 and an application 16022.

The operation system 16021 includes various system programs, such as a framework layer, a core library layer, a driver layer, and the like, for implementing various basic services and processing hardware-based tasks. The application 16022 includes various applications, such as a media player, a browser, and the like, for implementing various application services. Programs that implement the methods of some embodiments of the present disclosure may be included in the application 16022.

In some embodiments of the present disclosure, the mobile terminal 1600 further includes a computer program stored on the storage 1602 and running on the processor 1601; specifically, it may be a computer control program in the application 16022 which, when executed by the processor 1601, causing the processor 1601 to perform the following steps: carrying uplink control information on at least one control region of a grant-free resource; and transmitting the uplink control information carried on the grant-free resource to a base station.

The above method disclosed by some embodiments of the present disclosure may be applied in the processor 1601, or implemented by the processor 1601. The processor 1601 may be an integrated circuit chip having a signal-processing capability. During the implementation process, the steps of the above method may be implemented by the hardware integrated logic circuit in the processor 1601 or software instructions. The above processor 1601 may be a general-purpose processor, a digital signal processor (DSP), an application specific integrated circuit (ASIC), a field programmable gate array (FPGA), or other programmable logic device, discrete gate or transistor logic device, discrete hardware component. The methods, steps, and logical block diagrams disclosed in some embodiments of the present disclosure may be implemented or performed. The general purpose processor may be a microprocessor, or the processor may be any conventional processor or the like. The steps of the methods disclosed in connection with some embodiments of the present disclosure may be directly embodied by the hardware decoding processor, or by a combination of hardware and software modules in the decoding processor. The software modules can be located in a conventional computer readable storage medium of the art, such as random access memory, a flash memory, a read only memory, a programmable read only memory or an electrically erasable programmable memory, a register, and the like. The computer readable storage medium is located in the storage 1602, and the processor 1601 reads the information in the storage 1602 to perform the steps of the above method in conjunction with its hardware. Specifically, the computer readable storage medium stores thereon a computer program which, when executed by the processor 1601, causes the processor 1601 to implement the following steps.

It will be appreciated that these embodiments described herein may be implemented in hardware, software, firmware, middleware, microcode, or a combination thereof. For a hardware implementation, the processing unit can be implemented in one or more application specific integrated circuits (ASICs), digital signal processors (DSPs), digital signal processing devices (DSPDs), programmable logic devices (PLDs), field-programmable gate arrays (FPGAs), general purpose processors, controllers, micro-controllers, microprocessors, other electronic units for performing the functions described in this disclosure or a combination thereof.

For a software implementation, the techniques described herein may be implemented by modules (e.g., procedures, functions, and so on) that perform the functions described herein. Software codes may be stored in the storage and executed by the processor. The storage may be implemented in the processor or external to the processor.

Optionally, when the computer program is executed by the processor 1601, the processor 1601 achieves: acquiring first configuration information of the control region; carrying the uplink control information on at least one control region of the grant-free resource according to the first configuration information.

Optionally, when the computer program is executed by the processor 1601, the processor 1601 achieves: receiving the first configuration information of the control region sent by the base station through a first predetermined message; or acquiring the first configuration information of the control region predefined by a communication protocol; wherein the first predetermined message includes at least one of: a radio resource control (RRC) message, a physical layer signaling, and a medium access control (MAC) layer control element (CE).

Specifically, the first configuration information includes: time-frequency domain resource allocation information of the control region, and/or a carrying manner of the uplink control information on the control region.

Further, in a case that the first configuration information includes the time-frequency domain resource allocation information of the control region, the time-frequency domain resource allocation information of the control region includes at least one of: a size of the time-frequency domain resource of the control region, allocation of time domain resource of the control region, and allocation of frequency domain resource of the control region.

Further, in a case that time-frequency domain resource allocation information of the control region includes the allocation of the time domain resource of the control region, the allocation of the time domain resource of the control region includes that: a time domain resource position of the control region is adjacent to a time domain position of a reference signal of the grant-free resource; and/or in a case that there are at least two control regions, the time domain resources of at least two control regions are overlapped with or orthogonal to each other.

Further, in a case that time-frequency domain resource allocation information of the control region includes the allocation of the frequency domain resource of the control region, the allocation of the frequency domain resource of the control region includes at least one of that: the frequency domain resource of the control region is centralized or distributed; the frequency domain resource of the control region are located on a frequency domain resource position of a reference signal of the grant-free resource; and in a case that the frequency domain resource of the control region is distributed, the frequency resources of at least two control regions are allocated in a comb manner.

Further, in a case that the first configuration information includes the carrying manner of the uplink control information on the control region, the carrying manner of the uplink control information on the control region includes at least one of that: at least one piece of uplink control information is mapped to different time-frequency domain resource positions of one control region; in a case that there are at least two control regions, at least one piece of uplink control information is mapped to different control region; in a case that there are at least two control regions, different control regions carry uplink control information with different transmission parameters.

Optionally, when the computer program is executed by the processor 1601, the processor 1601 achieves: mapping at least one piece of uplink control information to different control region according to a priority of the control region; wherein, the priority of the control region is determined according to a predetermined parameter, and the predetermined parameter includes at least one of: a size of the time-frequency domain resource of the control region, a modulation and coding scheme, and a transmission power.

Optionally, when the computer program is executed by the processor 1601, the processor 1601 achieves: acquiring format information of the uplink control information; and carrying the uplink control information on at least one control region of the grant-free resource according to the format information of the uplink control information.

Optionally, when the computer program is executed by the processor 1601, the processor 1601 achieves: acquiring the format information of the uplink control information sent by the base station through a second predetermined message; or acquiring the format information of the uplink control information predefined by a communication protocol; wherein the second predetermined message includes at least one of: an RRC message, a physical layer signaling, and a MAC CE.

Specifically, the format information of the uplink control information includes: using at least one of frequency division multiplexing, time division multiplexing, and code division multiplexing to perform multiplexing of the uplink control information of different terminals on the grant-free resource.

Optionally, when the computer program is executed by the processor 1601, the processor 1601 achieves: transmitting the uplink control information and data carried on the grant-free resource to the base station.

Optionally, when the computer program is executed by the processor 1601, the processor 1601 achieves: acquiring second configuration information of a multiplexing manner of the uplink control information and the data on the grant-free resource; performing multiplexing of the uplink control information and the data on the grant-free resource according to the second configuration information, so as to carry the uplink control information in at least one control region of the grant-free resource.

Optionally, when the computer program is executed by the processor 1601, the processor 1601 achieves: acquiring the second configuration information of the multiplexing manner of the uplink control information and the data on the grant-free resource sent by the base station through a third predetermined message; or acquiring the second configuration information of the multiplexing manner of the uplink control information and the data on the grant-free resource predefined by a communication protocol; wherein the third predetermined message comprises at least one of: an RRC message, a physical layer signaling, and a MAC CE.

Specifically, the second configuration information includes: a multiplexing manner of puncturing the data and/or a multiplexing manner of rate matching the uplink control information and the data.

Optionally, when the computer program is executed by the processor 1601, the processor 1601 achieves: acquiring retransmission configuration information of the uplink control information of the control region; retransmitting the uplink control information and the data carried on the grant-free resource to the base station according to the retransmission configuration information; wherein the retransmission configuration information includes that: the number of retransmissions of the uplink control information of the control region is less than or equal to the number of retransmissions of the data in the grant-free resource.

The terminal 1600 can implement the processes implemented by the terminal in the above embodiment, which will not be repeated here in order to avoid repetition.

The terminal according to some embodiments of the present disclosure transmits the uplink control information carried on the grant-free resource to the base station by carrying the uplink control information on at least one control region of the grant-free resource, thereby achieving the multiplexing of the uplink control information on the grant-free resource, improving the communication process and ensuring the reliability of the network communication.

Figure 17:
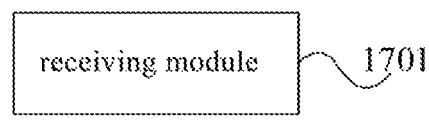
FIG. 17 illustrates a schematic diagram of modules of a base station according to some embodiments of the present disclosure.

As shown in FIG. 17, some embodiments of the present disclosure provides a base station which includes a receiving module 1701 for receiving uplink control information carried on a grant-free resource transmitted by a terminal; wherein the uplink control information is carried on at least one control region of the grant-free resource.

Further, the base station includes: a first sending module for sending a first configuration information of the control region to the terminal through a first predetermined message; wherein the first predetermined message comprises at least one of: a radio resource control (RRC) message, a physical layer signaling, and a medium access control (MAC) layer control element (CE).

Specifically, the first configuration information includes: time-frequency domain resource allocation information of the control region, and/or a carrying manner of the uplink control information on the control region.

Further, in a case that the first configuration information includes the time-frequency domain resource allocation information of the control region, the time-frequency domain resource allocation information of the control region includes at least one of: a size of the time-frequency domain resource of the control region, allocation of time domain resource of the control region, and allocation of frequency domain resource of the control region.

Further, in a case that time-frequency domain resource allocation information of the control region includes the allocation of the time domain resource of the control region, the allocation of the time domain resource of the control region comprises that: a time domain resource position of the control region is adjacent to a time domain position of a reference signal of the grant-free resource; and/or in a case that there are at least two control regions, the time domain resources of at least two control regions are overlapped with or orthogonal to each other.

Further, in a case that time-frequency domain resource allocation information of the control region includes the allocation of the frequency domain resource of the control region, the allocation of the frequency domain resource of the control region includes at least one of that: the frequency domain resource of the control region is centralized or distributed; the frequency domain resource of the control region are located on a frequency domain resource position of a reference signal of the grant-free resource; and in a case that the frequency domain resource of the control region is distributed, the frequency resources of at least two control regions are allocated in a comb manner.

Further, in a case that the first configuration information includes the carrying manner of the uplink control information on the control region, the carrying manner of the uplink control information on the control region includes at least one of that: at least one piece of uplink control information is mapped to different time-frequency domain resource positions of one control region; in a case that there are at least two control regions, at least one piece of uplink control information is mapped to different control region; in a case that there are at least two control regions, different control regions carry uplink control information with different transmission parameters.

Further, in a case that there are at least two control regions, at least one piece of uplink control information is mapped to different control region by: mapping at least one piece of uplink control information to different control region according to a priority of the control region; wherein, the priority of the control region is determined according to a predetermined parameter, and the predetermined parameter includes at least one of: a size of the time-frequency domain resource of the control region, a modulation and coding scheme, and a transmission power.

Further, the base station includes: a second sending module for sending format information of the uplink control information to the terminal through a second predetermined message; wherein the second predetermined message includes at least one of: an RRC message, a physical layer signaling, and a MAC CE.

Specifically, the format information of the uplink control information includes: using at least one of frequency division multiplexing, time division multiplexing, and code division multiplexing to perform multiplexing of the uplink control information of different terminals on the grant-free resource.

Further, in a case that the format information of the uplink control information includes using the frequency division multiplexing and/or the time division multiplexing to perform multiplexing of the uplink control information of different terminals on the grant-free resource, the time domain resource and/or the frequency domain resource used by the uplink control information of different terminals are resources shared with data in the grant-free resources, or the time domain resource and/or the frequency domain resource used by the uplink control information of different terminals are dedicated resources in the grant-free resources.

Further, in a case that the format information of the uplink control information includes using the code division multiplexing to perform multiplexing of the uplink control information of different terminals on the grant-free resource, sequences used by the uplink control information of different terminals are different from each other; or payload of the uplink control information of different terminals is processed by a predetermined sequence; wherein the predetermined sequence includes: an orthogonal cover code (OCC) and/or a scrambling sequence.

Specifically, the receiving module is configured to: receive the uplink control information and data carried on the grant-free resource transmitted by the terminal.

Further, the base station includes: a third sending module for sending a second configuration information of a multiplexing manner of the uplink control information and the data on the grant-free resource to the terminal through a third predetermined message; wherein the third predetermined message includes at least one of: an RRC message, a physical layer signaling, and a MAC CE.

Specifically, the second configuration information includes: a multiplexing manner of puncturing the data and/or a multiplexing manner of rate matching the uplink control information and the data.

Further, the receiving module includes: a sending unit for sending retransmission configuration information of the uplink control information of the control region to the terminal; a receiving unit for receiving the uplink control information and the data carried on the grant-free resource retransmitted by the terminal; wherein the retransmission configuration information includes that: the number of retransmissions of the uplink control information of the control region is less than or equal to the number of retransmissions of the data in the grant-free resource.

It should be noted that, the base station embodiment is a base station corresponding to the information transmission method applied to the base station side. All the implementations of the foregoing embodiment are applicable to the base station embodiment, and the same technical effects can also be achieved.

Some embodiments of the present disclosure further provide a base station which includes a storage, a processor and a computer program stored in the storage and running in the processor, the computer program, when executed by the processor, is capable of causing the processor to achieve the processes in the above embodiment of the information transmission method applied to the base station side, and the same technical effects can also be achieved, which will not be repeated in order to avoid repetition.

Some embodiments of the present disclosure further provide a computer readable storage medium, wherein the computer readable storage medium stores thereon a computer program which, when executed by a processor, is capable of causing the processor to achieve the processes in the above embodiment of the information transmission method applied to the base station side, and the same technical effects can also be achieved, which will not be repeated in order to avoid repetition. The computer readable storage medium may be a volatile computer readable storage medium or a nonvolatile computer readable storage medium or a transient computer readable storage medium such as a read-only memory (ROM), a random access memory (RAM), a magnetic disk or an optical disk or the like.

Figure 18:
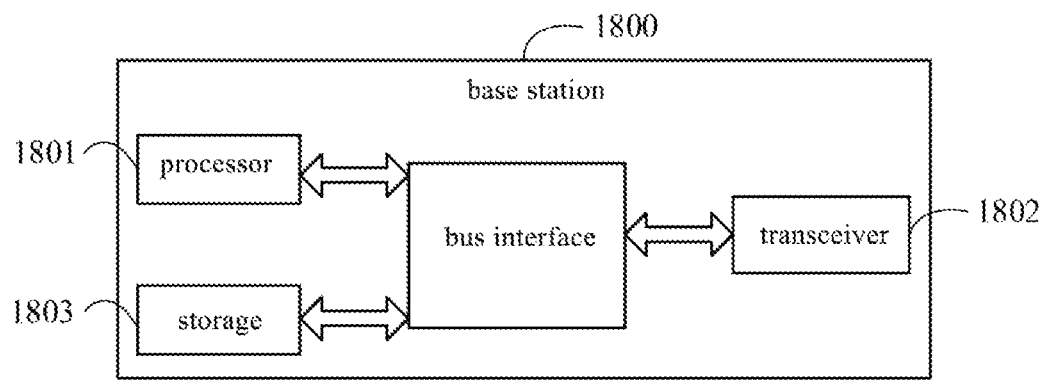
FIG. 18 illustrates a structural block diagram of a base station according to some embodiments of the present disclosure.

FIG. 18 is a structural diagram of a base station according to the present disclosure capable of implementing the details of the above information transmission method applied to the base station side, and achieving the same technical effects. As shown in FIG. 18, the base station 1800 includes: a processor 1801, a transceiver 1802, a storage 1803 and a bus interface, wherein the processor 1801 is configured to read a program stored in the storage 1803 and perform the following process: receiving, through the transceiver 1802, uplink control information carried on a grant-free resource transmitted by a terminal; wherein the uplink control information is carried on at least one control region of the grant-free resource.

In FIG. 18, the bus architecture may include any number of interconnected buses and bridges, which are specifically linked by various circuits including one or more processors represented by the processor 1801 and storages represented by the storage 1803. The bus architecture can also link various other circuits such as peripherals, voltage regulators, and power management circuits, which are well known in the art and, therefore, will not be further described herein. The bus interface provides an interface. The transceiver 1802 may be multiple components, i.e., including a transmitter and a receiver, providing units for communicating with various other devices on a transmission medium.

The processor 1801 is responsible for managing the bus architecture and general processing, and the storage 1803 may store data used by the processor 1801 in performing operations.

Optionally, the processor 1801 reads the program in the storage 1803 to further perform: sending a first configuration information of the control region to the terminal through a first predetermined message; wherein the first predetermined message includes at least one of: a radio resource control (RRC) message, a physical layer signaling, and a medium access control (MAC) layer control element (CE).

Specifically, the first configuration information includes: time-frequency domain resource allocation information of the control region, and/or a carrying manner of the uplink control information on the control region.

Further, in a case that the first configuration information includes the time-frequency domain resource allocation information of the control region, the time-frequency domain resource allocation information of the control region includes at least one of: a size of the time-frequency domain resource of the control region, allocation of time domain resource of the control region, and allocation of frequency domain resource of the control region.

Further, in a case that time-frequency domain resource allocation information of the control region includes the allocation of the time domain resource of the control region, the allocation of the time domain resource of the control region includes that: a time domain resource position of the control region is adjacent to a time domain position of a reference signal of the grant-free resource; and/or in a case that there are at least two control regions, the time domain resources of at least two control regions are overlapped with or orthogonal to each other.

Further, in a case that time-frequency domain resource allocation information of the control region includes the allocation of the frequency domain resource of the control region, the allocation of the frequency domain resource of the control region includes at least one of that: the frequency domain resource of the control region is centralized or distributed; the frequency domain resource of the control region are located on a frequency domain resource position of a reference signal of the grant-free resource; and in a case that the frequency domain resource of the control region is distributed, the frequency resources of at least two control regions are allocated in a comb manner.

Further, in a case that the first configuration information includes the carrying manner of the uplink control information on the control region, the carrying manner of the uplink control information on the control region includes at least one of that: at least one piece of uplink control information is mapped to different time-frequency domain resource positions of one control region; in a case that there are at least two control regions, at least one piece of uplink control information is mapped to different control region; in a case that there are at least two control regions, different control regions carry uplink control information with different transmission parameters.

Optionally, the processor 1801 reads the program in the storage 1803 to further perform: mapping at least one piece of uplink control information to different control region according to a priority of the control region; wherein, the priority of the control region is determined according to a predetermined parameter, and the predetermined parameter includes at least one of: a size of the time-frequency domain resource of the control region, a modulation and coding scheme, and a transmission power.

Optionally, the processor 1801 reads the program in the storage 1803 to further perform: sending format information of the uplink control information to the terminal through a second predetermined message; wherein the second predetermined message comprises at least one of: an RRC message, a physical layer signaling, and a MAC CE.

Specifically, the format information of the uplink control information includes: using at least one of frequency division multiplexing, time division multiplexing, and code division multiplexing to perform multiplexing of the uplink control information of different terminals on the grant-free resource.

Further, in a case that the format information of the uplink control information includes using the frequency division multiplexing and/or the time division multiplexing to perform multiplexing of the uplink control information of different terminals on the grant-free resource, the time domain resource and/or the frequency domain resource used by the uplink control information of different terminals are resources shared with data among the grant-free resources, or the time domain resource and/or the frequency domain resource used by the uplink control information of different terminals are dedicated resources among the grant-free resources.

Further, in a case that the format information of the uplink control information includes using the code division multiplexing to perform multiplexing of the uplink control information of different terminals on the grant-free resource, sequences used by the uplink control information of different terminals are different from each other; or payload of the uplink control information of different terminals is processed by a predetermined sequence; wherein the predetermined sequence comprises: an orthogonal cover code (OCC) and/or a scrambling sequence.

Optionally, the processor 1801 reads the program in the storage 1803 to further perform: receiving the uplink control information and data carried on the grant-free resource transmitted by the terminal.

Optionally, the processor 1801 reads the program in the storage 1803 to further perform: sending a second configuration information of a multiplexing manner of the uplink control information and the data on the grant-free resource to the terminal through a third predetermined message; wherein the third predetermined message comprises at least one of: an RRC message, a physical layer signaling, and a MAC CE.

Specifically, the second configuration information includes: a multiplexing manner of puncturing the data and/or a multiplexing manner of rate matching the uplink control information and the data.

Optionally, the processor 1801 reads the program in the storage 1803 to further perform: sending retransmission configuration information of the uplink control information of the control region to the terminal through the transceiver 1802; receiving the uplink control information and the data carried on the grant-free resource retransmitted by the terminal; wherein the retransmission configuration information includes that: the number of retransmissions of the uplink control information of the control region is less than or equal to the number of retransmissions of the data in the grant-free resource.

The base station according to some embodiments of the present disclosure achieves the multiplexing of the uplink control information on the grant-free resource, which improves the communication process and ensures the reliability of the network communication.

In the above solution, by carrying the uplink control information on at least one control region of the grant-free resource and transmitting the uplink control information to the base station, the multiplexing of the uplink control information on the grant-free resource is achieved, which improves the communication process and ensures the reliability of the network communication.

The embodiments in this specification are described in a progressive manner. Each embodiment focuses on the differences from other embodiments, and the same or similar parts between the various embodiments may refer to each other.

Those skilled in the art will be appreciated that some embodiments of the present disclosure may be provided as a method, a device, or a computer program product. Therefore, some embodiments of the present disclosure may take the form of an entirely hardware embodiment, an entirely software embodiment, or an embodiment combining software and hardware. Moreover, some embodiments of the present disclosure may employ computer program products implemented on one or more computer-usable storage media (including but not limited to disk storage, CD-ROM, optical storage, etc.) containing computer-usable program code.

Some embodiments of the present disclosure are described with reference to flowcharts and/or block diagrams of methods, terminal equipments (systems), and computer program products according to some embodiments of the present disclosure. It will be appreciated that each process and/or block in the flowcharts and/or block diagrams, and combinations of processes and blocks in the flowcharts and block diagrams. These computer program instructions may be provided to a processor of a general purpose computer, special purpose computer, embedded processor, or other programmable data processing terminal equipment to produce a machine, such that the instructions executed by the processor of the computer or other programmable data processing terminal equipment generate means for implementing the functions specified in one or more of the processes in the flowcharts and/or one or more of the blocks in the block diagrams.

These computer program instructions may also be stored in a computer-readable storage capable of directing a computer or other programmable data processing terminal equipment to work in a specific manner, such that the instructions stored in the computer-readable storage produce a manufactured article including the instruction means which implements the functions specified in one or more of the processes in the flowcharts and/or one or more of the blocks in the block diagrams.

These computer program instructions may also be loaded on a computer or other programmable data processing terminal equipment, so that a series of operation steps can be performed on the computer or other programmable terminal equipment to produce a computer-implemented process, so that the instructions executed on the computer or other programmable terminal equipment provide the steps for implementing the functions specified in one or more of the processes in the flowcharts and/or one or more of the blocks in the block diagrams.

Although alternative embodiments of some embodiments of the present disclosure have been described, those skilled in the art can make additional changes and modifications to these embodiments once they know the basic inventive concepts. Therefore, the appended claims are intended to be construed to include alternative embodiments and all changes and modifications that fall within the scope of some embodiments of the present disclosure.

It should also be noted that, herein, relational terms such as first and second are used only to distinguish one entity or operation from another, and do not necessarily require or imply there is any such actual relationship or order among these entities or operations. Moreover, the terms "including", "comprising", or any other variation thereof are intended to encompass non-exclusive inclusion, such that a process, method, article, or terminal equipment that includes a series of elements includes not only those elements but also those that are not explicitly listed. Without more restrictions, the elements defined by the sentence "including a . . . " do not exclude the existence of other identical elements in the process, method, article, or terminal equipment including said elements.

The above are optional implementations of the present disclosure. It should be noted that, for those of ordinary skill in the art, improvements and refinements can be made without departing from the principles described in the present disclosure. These improvements and refinements may also fall into the scope of this disclosure.

What is claimed is:

1. An information transmission method applied to a terminal, comprising:
   carrying uplink control information on at least one control region of a grant-free resource; and
   transmitting the uplink control information carried on the grant-free resource to a base station;
   wherein the step of transmitting the uplink control information carried on the grant-free resource to the base station comprises:
   transmitting the uplink control information and data carried on the grant-free resource to the base station;
   wherein the step of transmitting the uplink control information and the data carried on the grant-free resource to the base station comprises:
   acquiring retransmission configuration information of the uplink control information of the control region;
   retransmitting the uplink control information and the data carried on the grant-free resource to the base station according to the retransmission configuration information;
   wherein the retransmission configuration information comprises that: the number of retransmissions of the uplink control information of the control region is less than or equal to the number of retransmissions of the data in the grant-free resource.

2. The information transmission method according to claim 1, wherein the step of carrying the uplink control information on at least one control region of the grant-free resource comprises:
   acquiring first configuration information of the control region;
   carrying the uplink control information on at least one control region of the grant-free resource according to the first configuration information.

3. The information transmission method according to claim 2, wherein the step of acquiring the first configuration information of the control region comprises:
   receiving the first configuration information of the control region sent by the base station through a first predetermined message; or
   acquiring the first configuration information of the control region predefined by a communication protocol;
   wherein the first predetermined message comprises at least one of: a radio resource control (RRC) message, a physical layer signaling, and a medium access control (MAC) layer control element (CE).

4. The information transmission method according to claim 2, wherein the first configuration information comprises: time-frequency domain resource allocation information of the control region, and/or a carrying manner of the uplink control information on the control region.

5. The information transmission method according to claim 4, wherein, the first configuration information comprises the time-frequency domain resource allocation information of the control region, the time-frequency domain resource allocation information of the control region comprises at least one of: a size of the time-frequency domain resource of the control region, allocation of time domain resource of the control region, and allocation of frequency domain resource of the control region.

6. The information transmission method according to claim 5, wherein, the time-frequency domain resource allocation information of the control region comprises allocation of the time domain resource of the control region, the allocation of the time domain resource of the control region comprises that:
   a time domain resource position of the control region is adjacent to a time domain position of a reference signal of the grant-free resource; and/or in a case that there are at least two control regions, the time domain resources of at least two control regions are overlapped with or orthogonal to each other.

7. The information transmission method according to claim 5, wherein, the time-frequency domain resource allocation information of the control region comprises allocation of the frequency domain resource of the control region, the allocation of the frequency domain resource of the control region comprises at least one of that:
the frequency domain resource of the control region is centralized or distributed;
a frequency domain resource position of the control region is located on a frequency domain resource position of a reference signal of the grant-free resource; and
in a case that the frequency domain resource of the control region is distributed, the frequency resources of at least two control regions are allocated in a comb manner.

8. The information transmission method according to claim 4, wherein, the first configuration information comprises the carrying manner of the uplink control information on the control region, the carrying manner of the uplink control information on the control region comprises at least one of that:
at least one piece of uplink control information is mapped to different positions of time-frequency domain resources of one control region;
in a case that there are at least two control regions, at least one piece of uplink control information is mapped to different control regions;
in a case that there are at least two control regions, different control regions carry uplink control information with different transmission parameters.

9. The information transmission method according to claim 8, wherein, in a case that there are at least two control regions, at least one piece of uplink control information is mapped to different control regions by:
mapping at least one piece of uplink control information to different control regions according to a priority of each control region;
wherein, the priority of the control region is determined according to a predetermined parameter, and the predetermined parameter comprises at least one of: a size of the time-frequency domain resource of the control region, a modulation and coding scheme, and a transmission power.

10. The information transmission method according to claim 1, wherein the step of carrying the uplink control information on at least one control region of the grant-free resource comprises:
acquiring format information of the uplink control information; and
carrying the uplink control information on at least one control region of the grant-free resource according to the format information of the uplink control information.

11. The information transmission method according to claim 10, wherein the step of acquiring the format information of the uplink control information comprises:
acquiring the format information of the uplink control information sent by the base station through a second predetermined message; or
acquiring the format information of the uplink control information predefined by a communication protocol;
wherein the second predetermined message comprises at least one of: an RRC message, a physical layer signaling, and a MAC CE.

12. The information transmission method according to claim 10, wherein the format information of the uplink control information comprises: using at least one of frequency division multiplexing, time division multiplexing, and code division multiplexing to perform multiplexing of the uplink control information of different terminals on the grant-free resource.

13. The information transmission method according to claim 1, wherein the step of carrying the uplink control information on at least one control region of the grant-free resource comprises:
acquiring second configuration information of a multiplexing manner of the uplink control information and the data on the grant-free resource;
performing multiplexing of the uplink control information and the data on the grant-free resource according to the second configuration information, so as to carry the uplink control information in at least one control region of the grant-free resource.

14. The information transmission method according to claim 13, wherein the step of acquiring the second configuration information of the multiplexing manner of the uplink control information and the data on the grant-free resource comprises:
acquiring the second configuration information of the multiplexing manner of the uplink control information and the data on the grant-free resource sent by the base station through a third predetermined message; or
acquiring the second configuration information of the multiplexing manner of the uplink control information and the data on the grant-free resource predefined by a communication protocol;
wherein the third predetermined message comprises at least one of: an RRC message, a physical layer signaling, and a MAC CE.

15. The information transmission method according to claim 13, wherein the second configuration information comprises: a multiplexing manner of puncturing the data and/or a multiplexing manner of rate matching the uplink control information and the data.

16. An information transmission method applied to a base station, comprising:
receiving uplink control information carried on a grant-free resource transmitted by a terminal;
wherein the uplink control information is carried on at least one control region of the grant-free resource;
wherein the step of receiving the uplink control information carried on the grant-free resource transmitted by the terminal comprises:
receiving the uplink control information and data carried on the grant-free resource transmitted by the terminal;
wherein the step of receiving the uplink control information and the data carried on the grant-free resource transmitted by the terminal comprises:
sending retransmission configuration information of the uplink control information of the control region to the terminal;
receiving the uplink control information and the data carried on the grant-free resource retransmitted by the terminal;
wherein the retransmission configuration information comprises that: the number of retransmissions of the uplink control information of the control region is less than or equal to the number of retransmissions of the data in the grant-free resource.

17. A terminal comprising: a storage, a processor and a computer program stored in the storage and running in the processor, the computer program, when executed by the processor, is capable of causing the processor to perform the steps of:
- carrying uplink control information on at least one control region of a grant-free resource; and
- transmitting the uplink control information carried on the grant-free resource to a base stations;
- wherein the step of transmitting the uplink control information carried on the grant-free resource to the base station comprises:
- transmitting the uplink control information and data carried on the grant-free resource to the base station;
- wherein the step of transmitting the uplink control information and the data carried on the grant-free resource to the base station comprises:
- acquiring retransmission configuration information of the uplink control information of the control region;
- retransmitting the uplink control information and the data carried on the grant-free resource to the base station according to the retransmission configuration information; and
- wherein the retransmission configuration information comprises that: the number of retransmissions of the uplink control information of the control region is less than or equal to the number of retransmissions of the data in the grant-free resource.

18. A base station comprising: a storage, a processor and a computer program stored in the storage and running in the processor, the computer program, when executed by the processor, is capable of causing the processor to perform the steps of the information transmission method according to claim 16.

* * * * *